Nov. 13, 1928.
C. A. PORATH
1,691,166
WIRE FENCE MACHINE
Filed Feb. 14, 1924 22 Sheets-Sheet 7
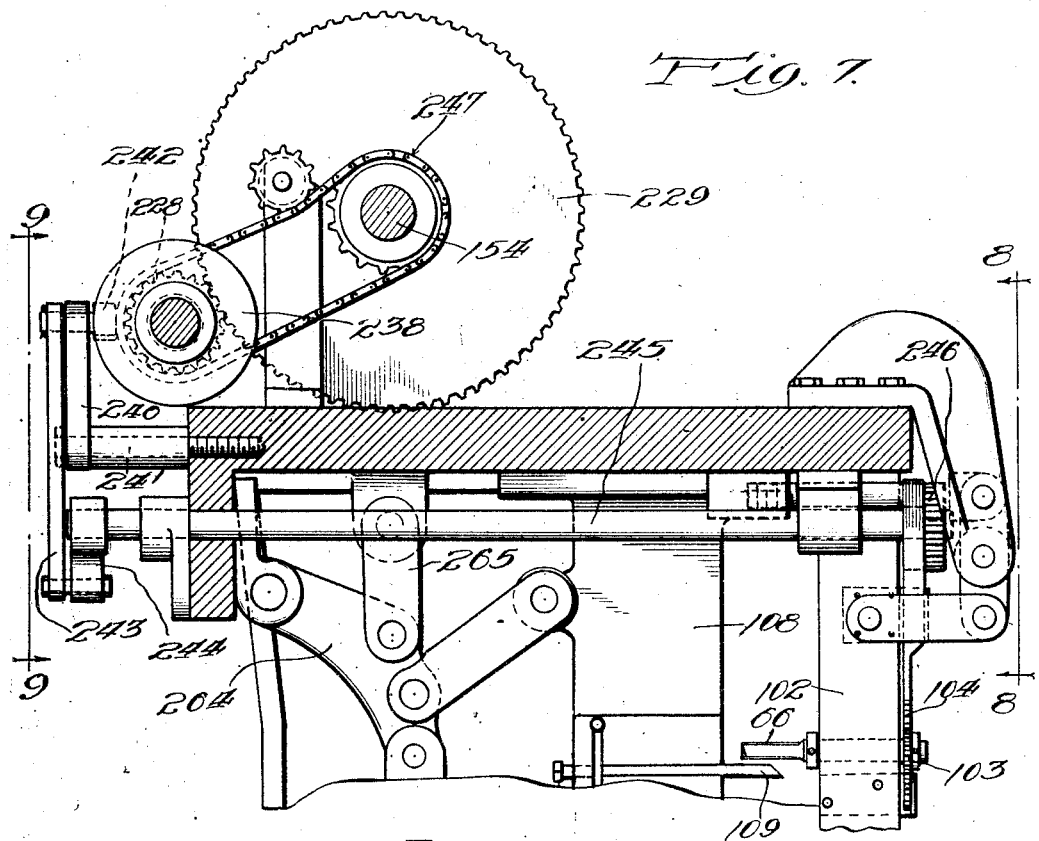
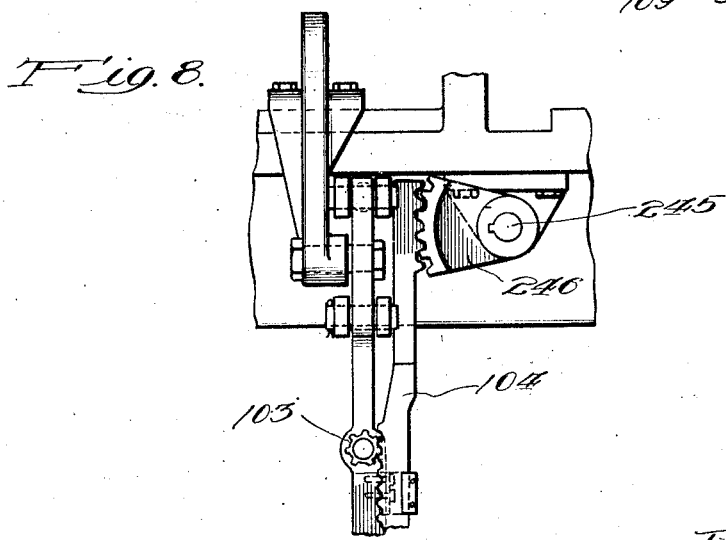

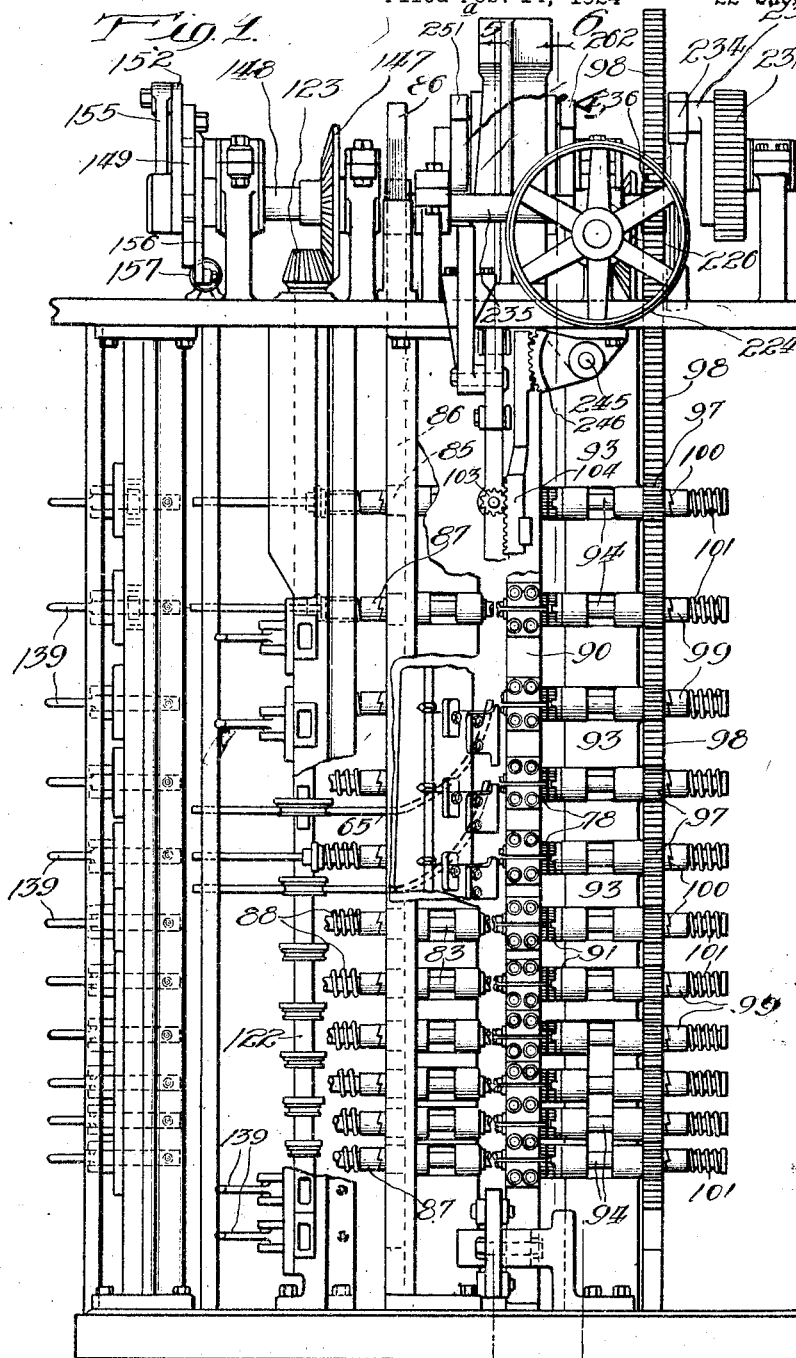

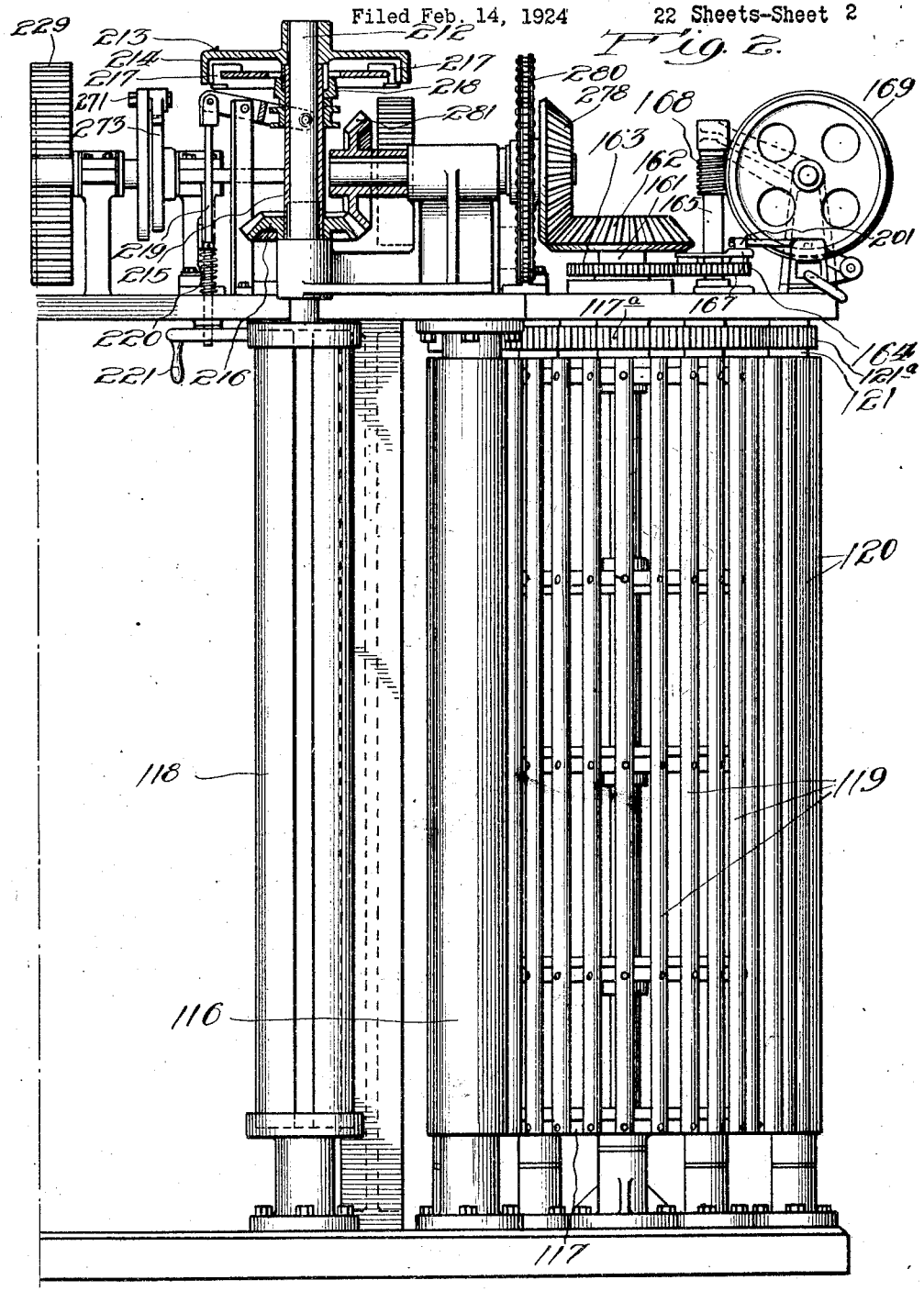

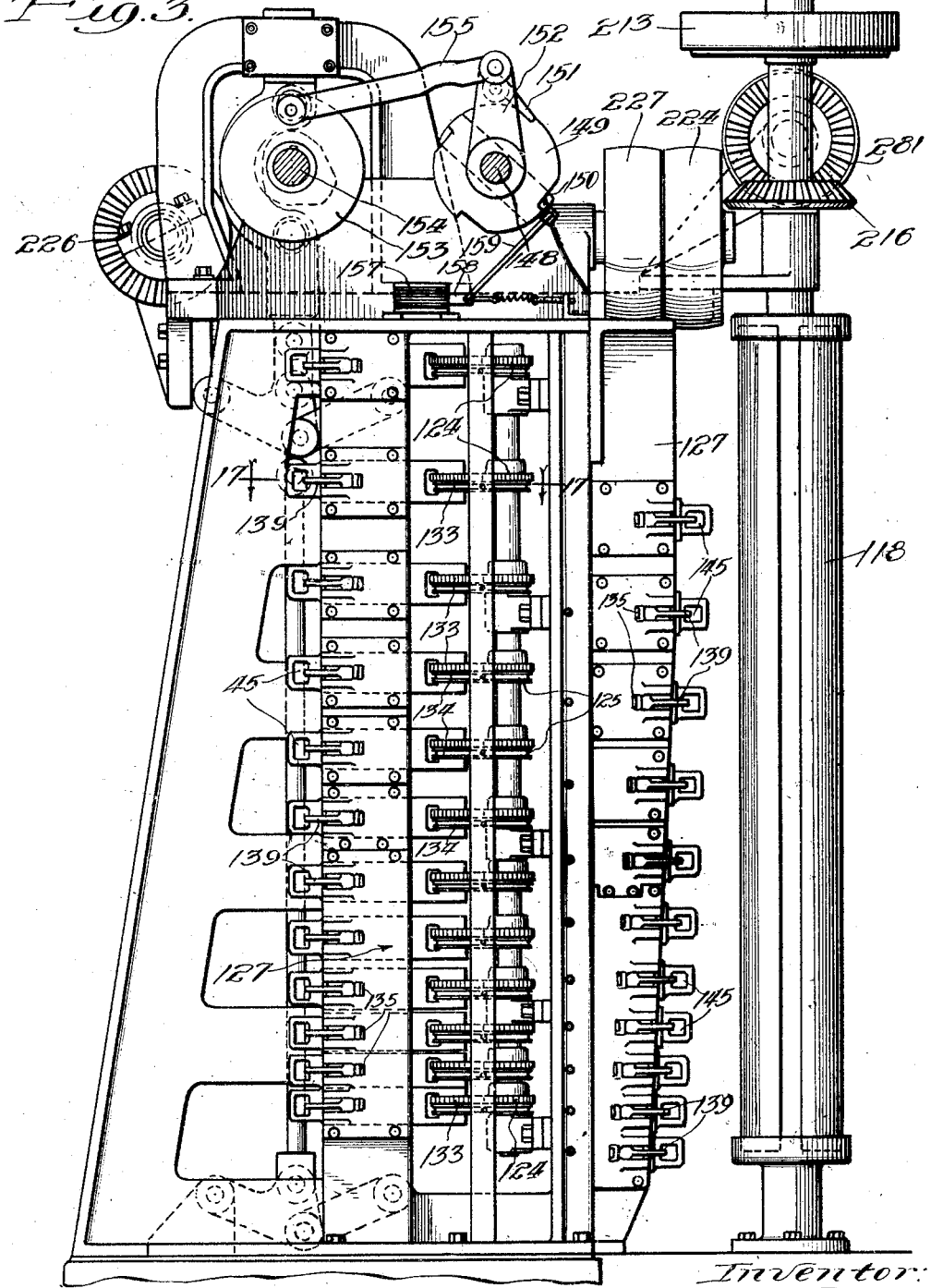

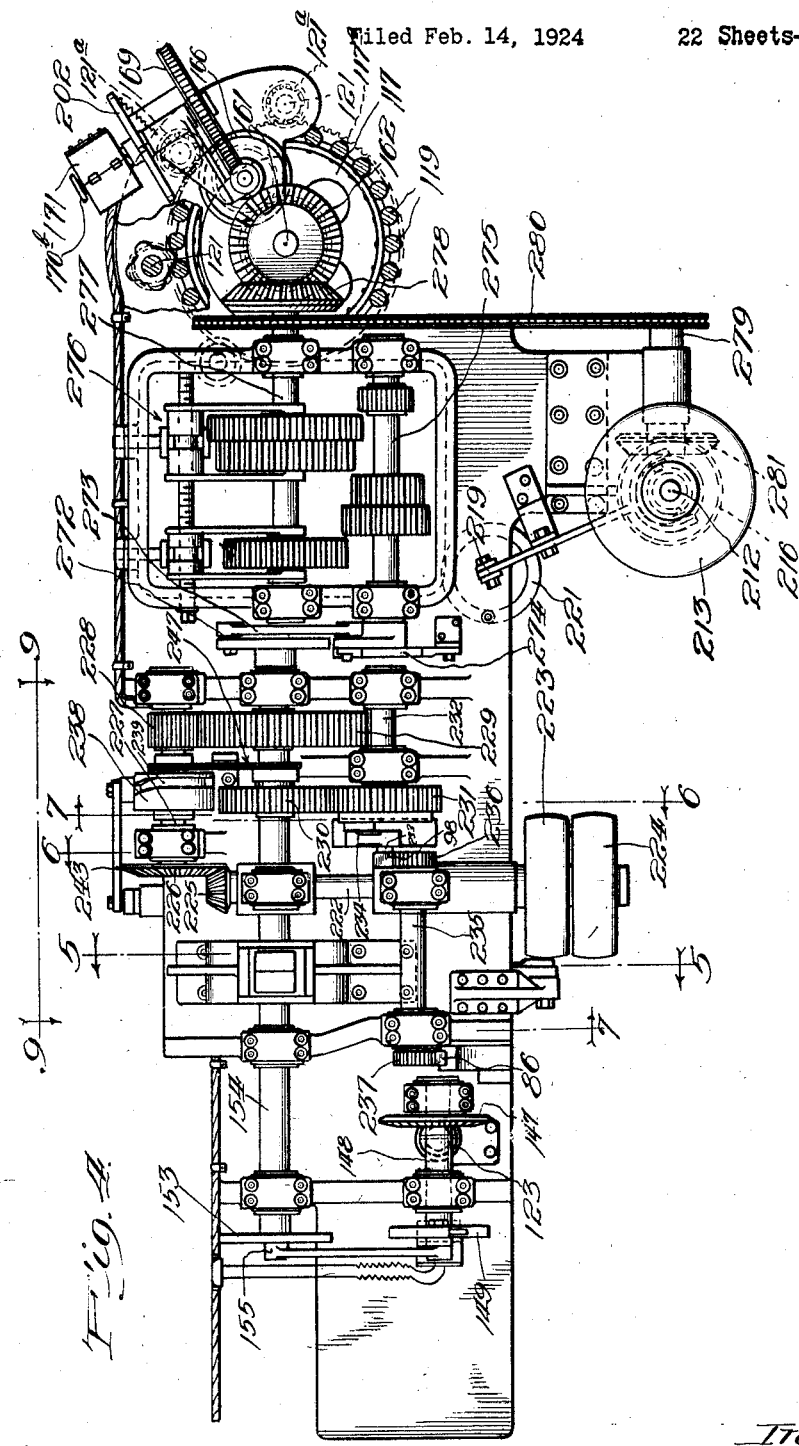

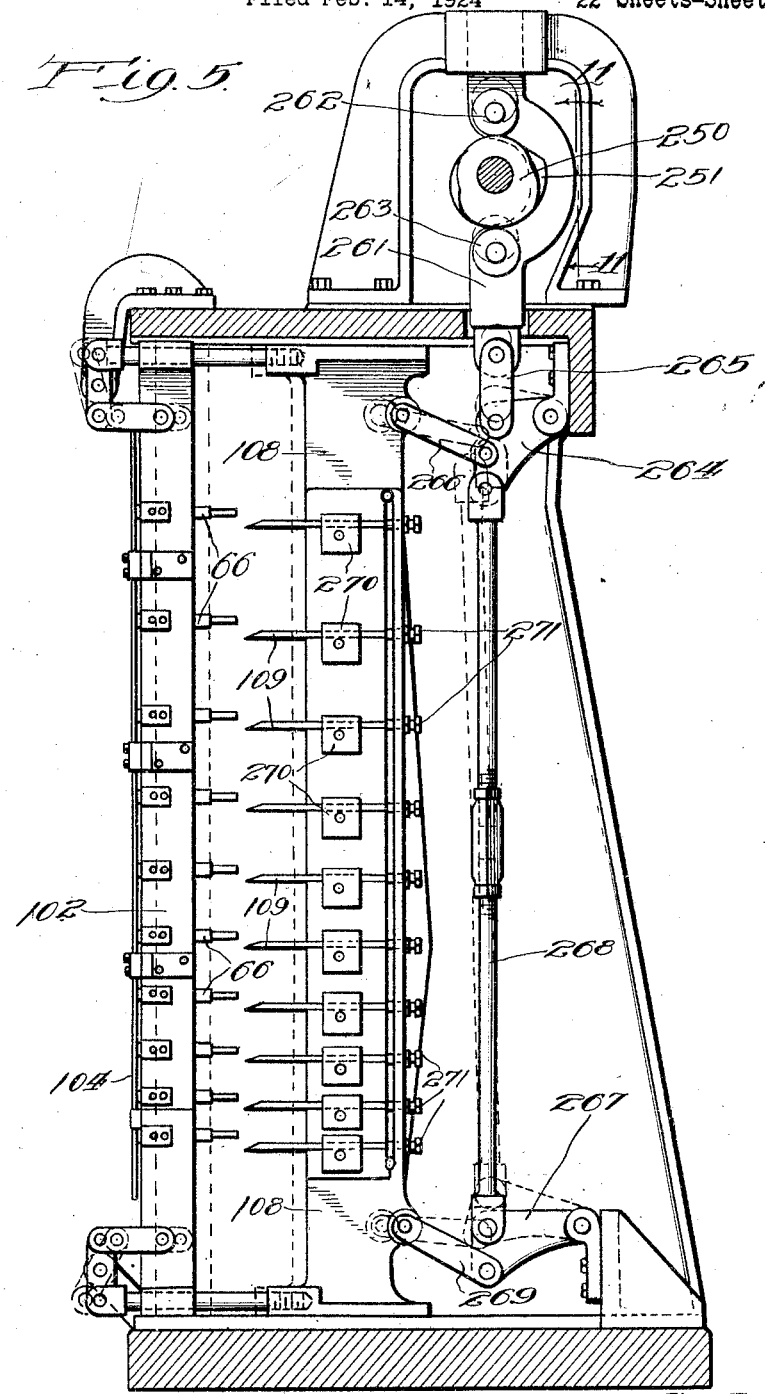

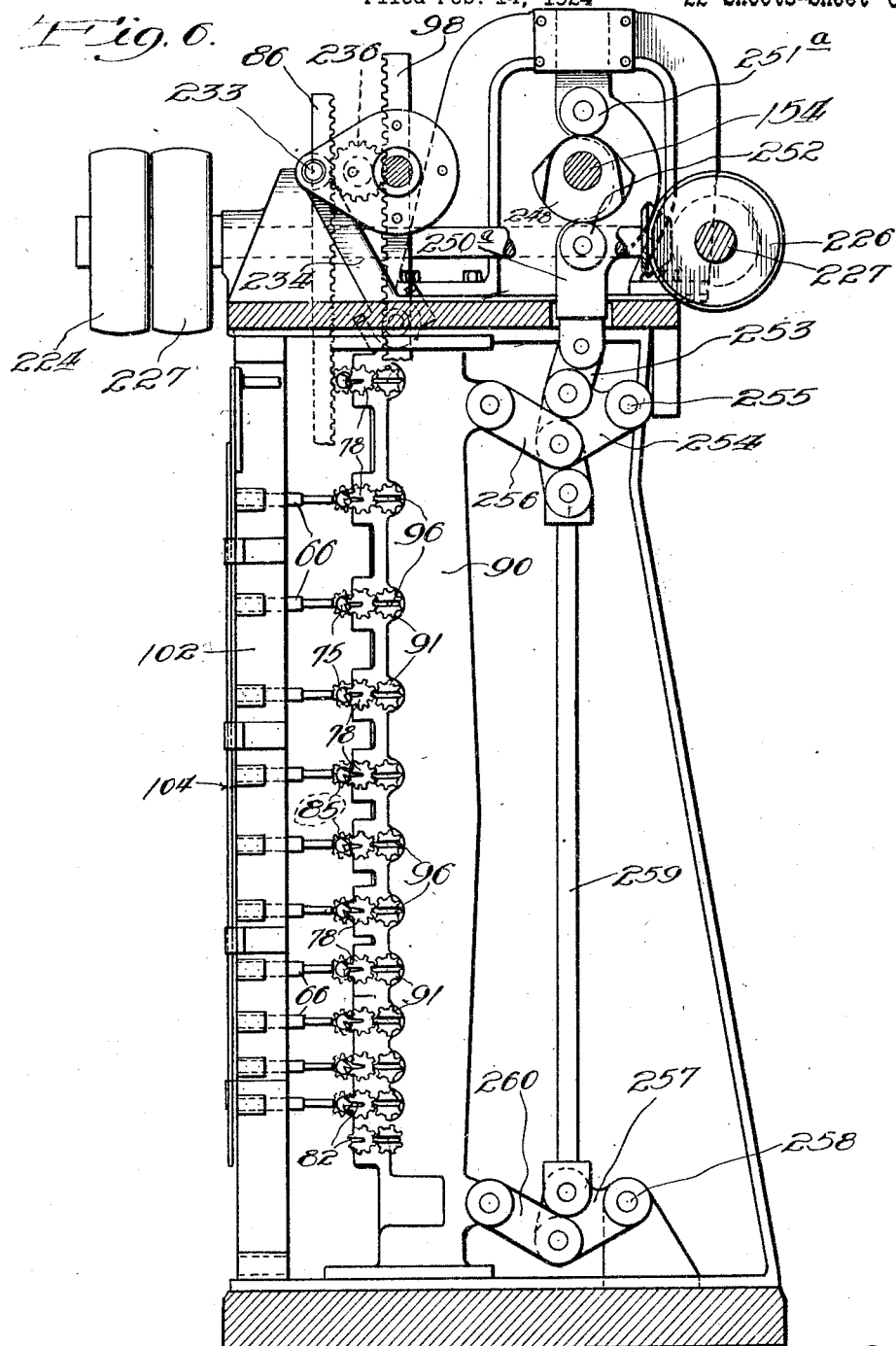

Nov. 13, 1928.

C. A. PORATH 1,691,166

WIRE FENCE MACHINE

Filed Feb. 14, 1924     22 Sheets-Sheet 9

Nov. 13, 1928.　　　　　　　　　　　　　　1,691,166
C. A. PORATH
WIRE FENCE MACHINE
Filed Feb. 14, 1924　　　22 Sheets-Sheet 10

Witness:
Stephen F. Pelora

Inventor:
Carl A. Porath,
by Chinney & Chinney
Attys

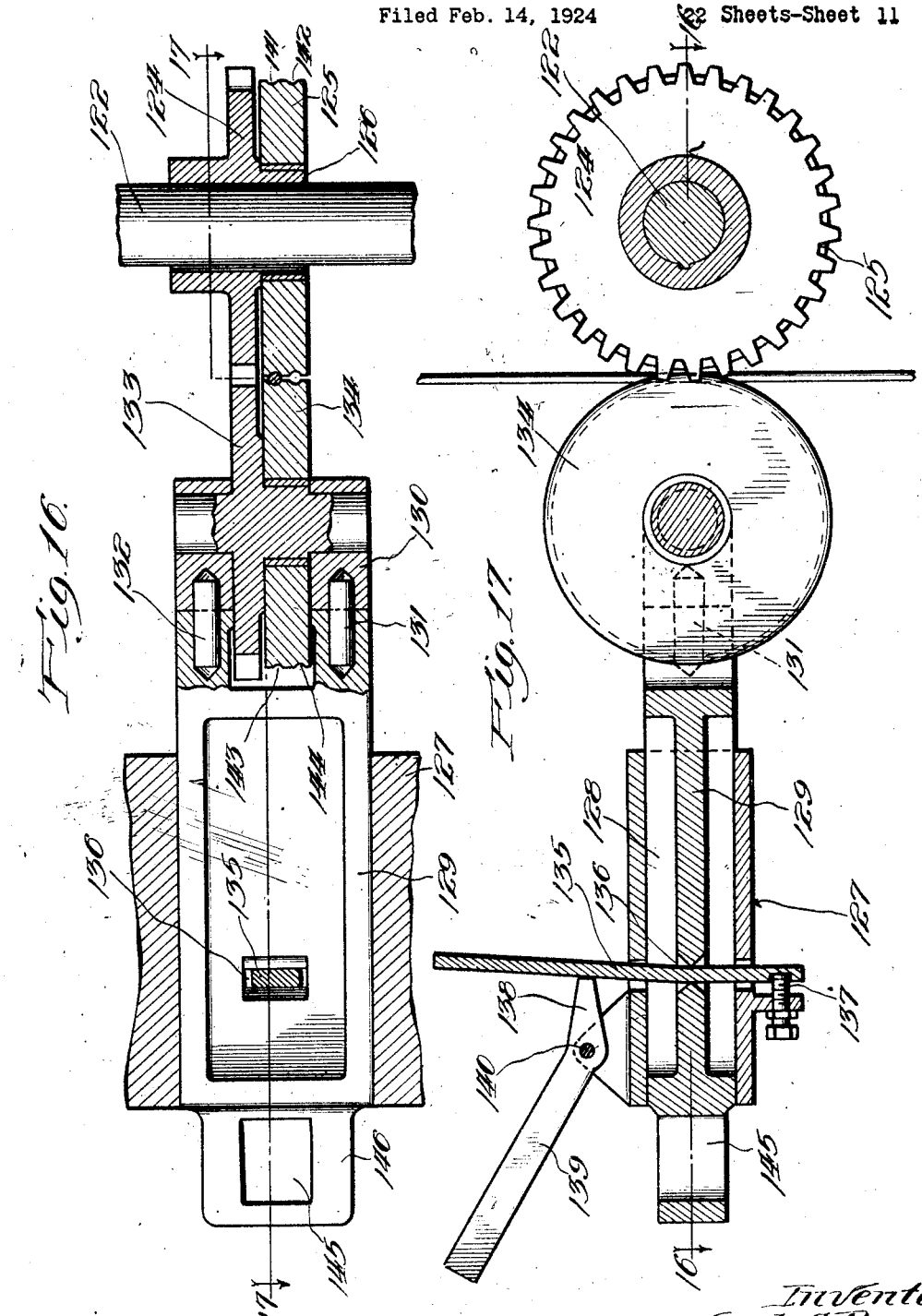

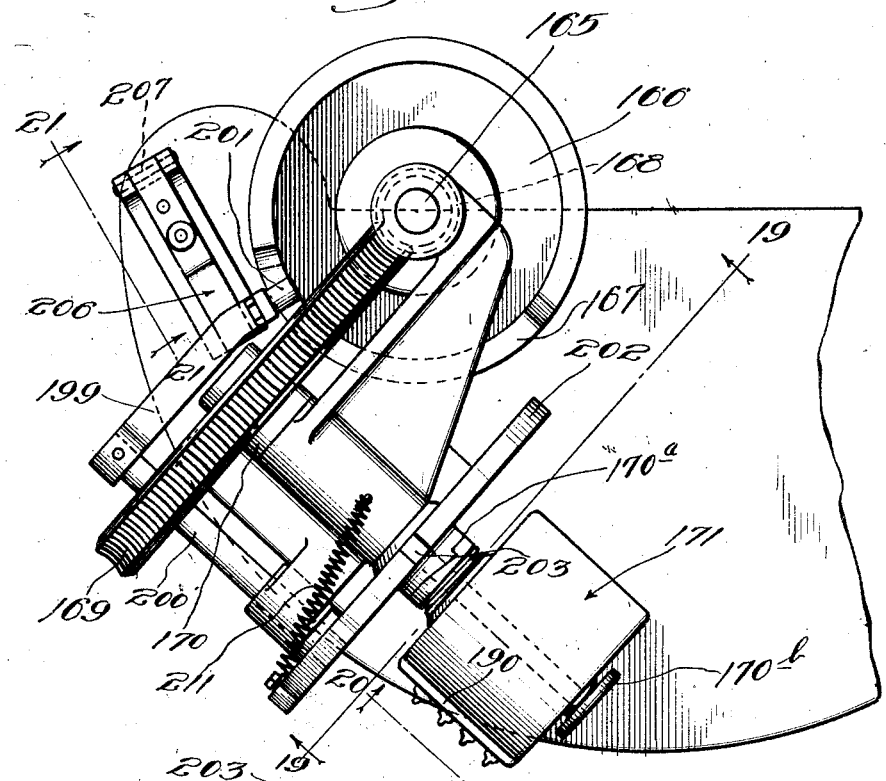
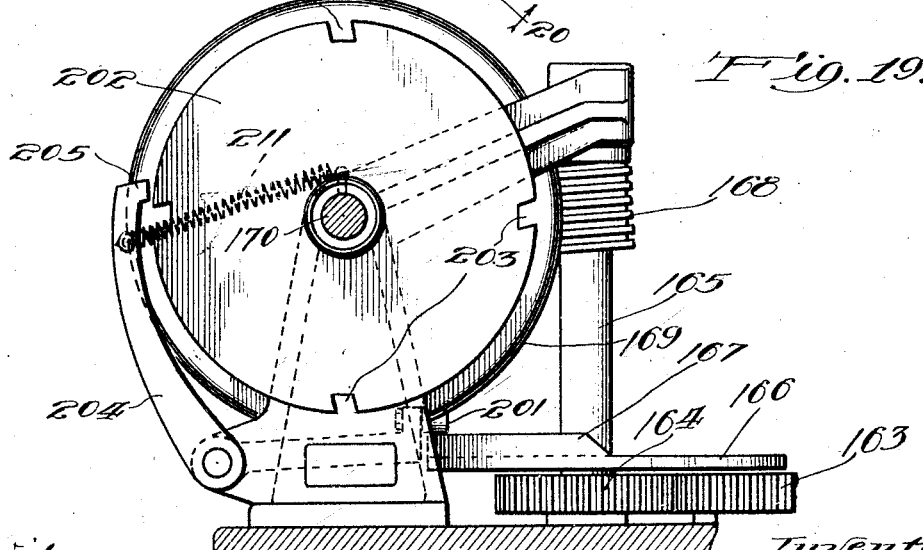

Nov. 13, 1928.
C. A. PORATH
1,691,166
WIRE FENCE MACHINE
Filed Feb. 14, 1924      22 Sheets-Sheet 13
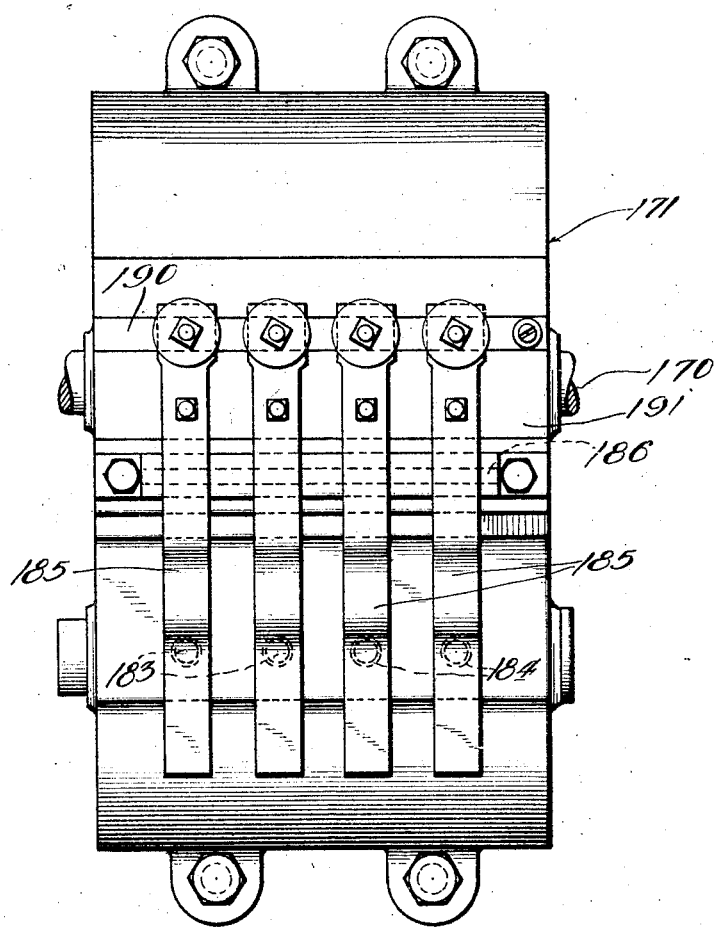
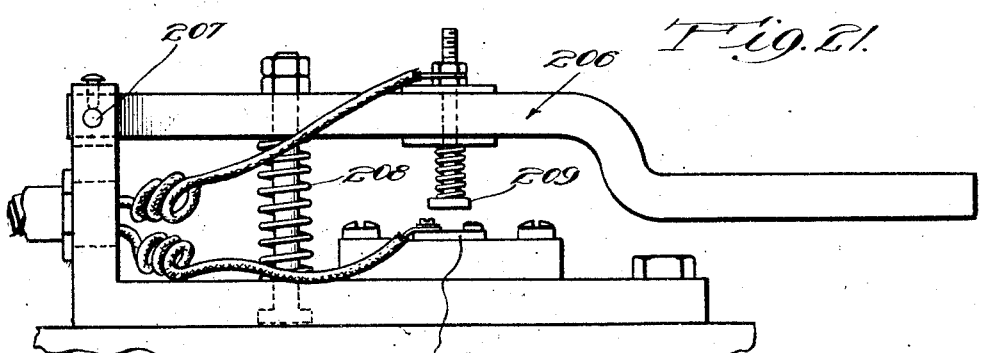

Nov. 13, 1928.
C. A. PORATH
1,691,166
WIRE FENCE MACHINE
Filed Feb. 14, 1924    22 Sheets-Sheet 14
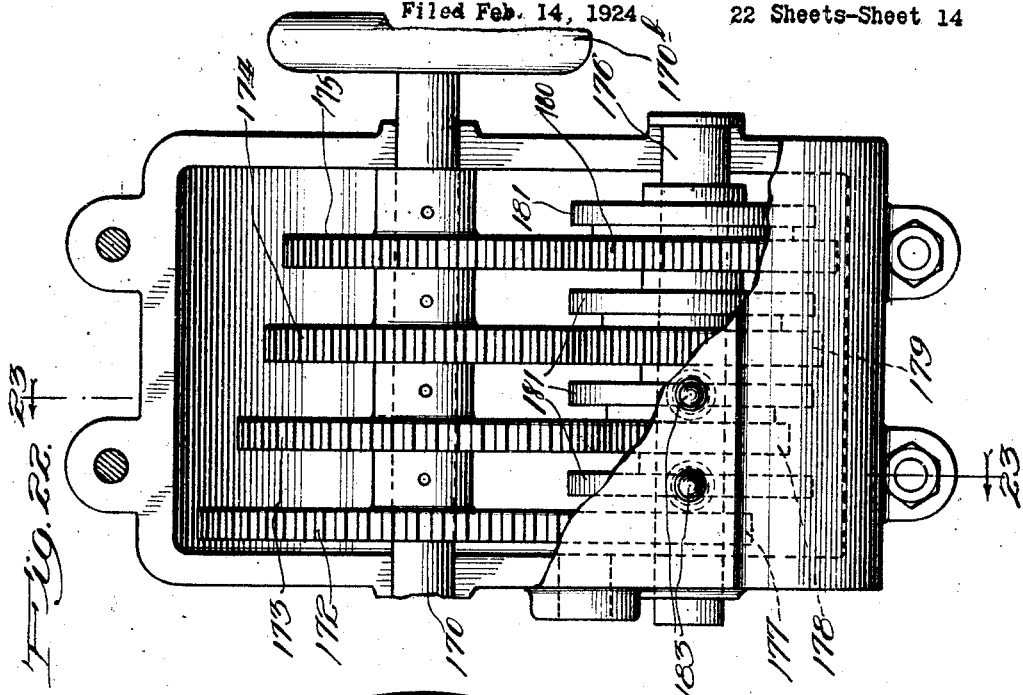
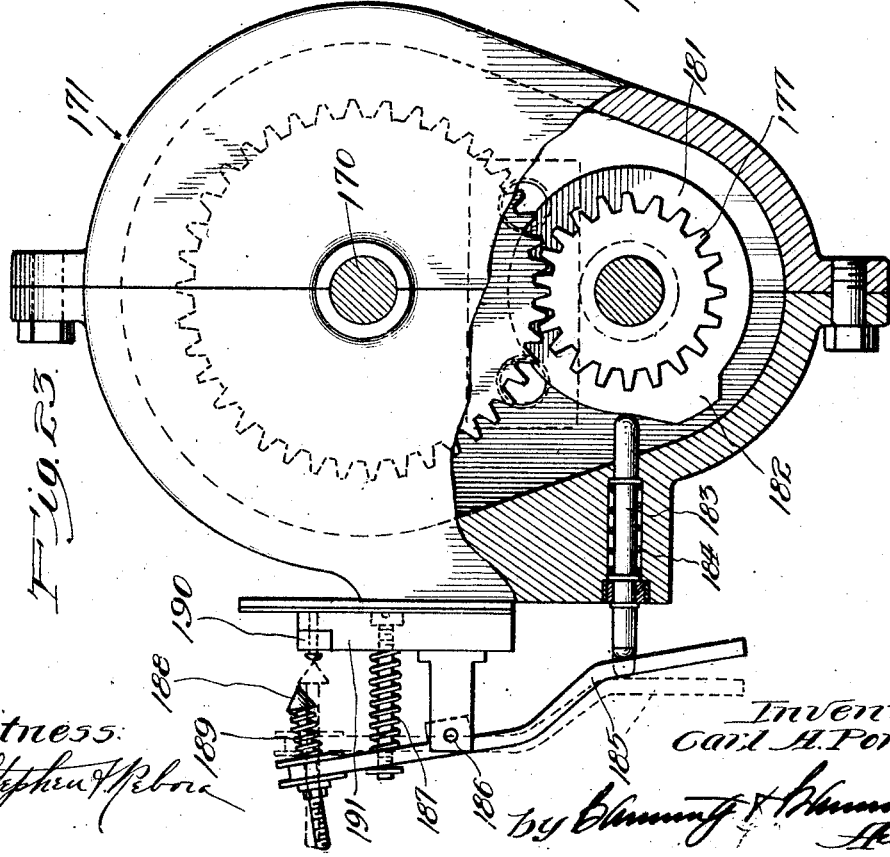
Inventor:
Carl A. Porath Nov. 13, 1928.  1,691,166
C. A. PORATH
WIRE FENCE MACHINE
Filed Feb. 14, 1924  22 Sheets-Sheet 15

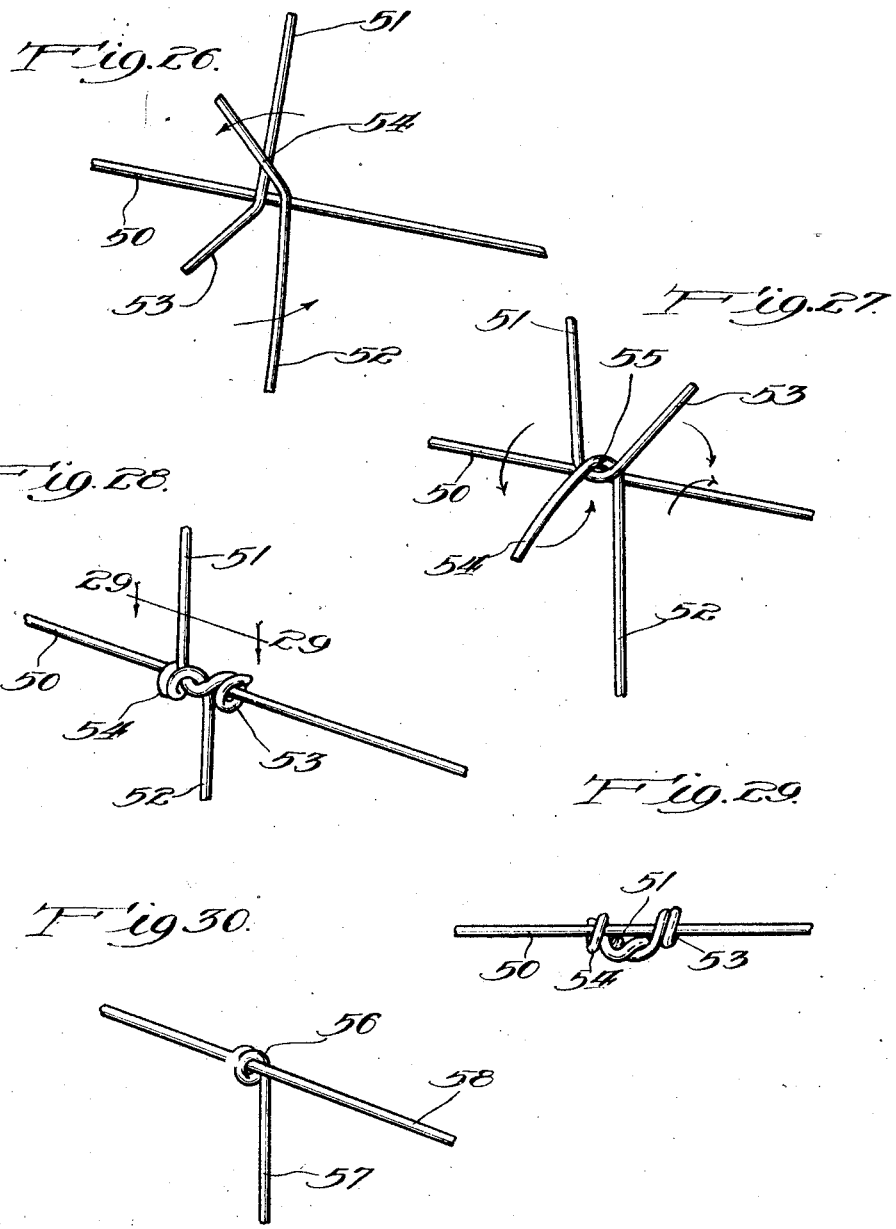

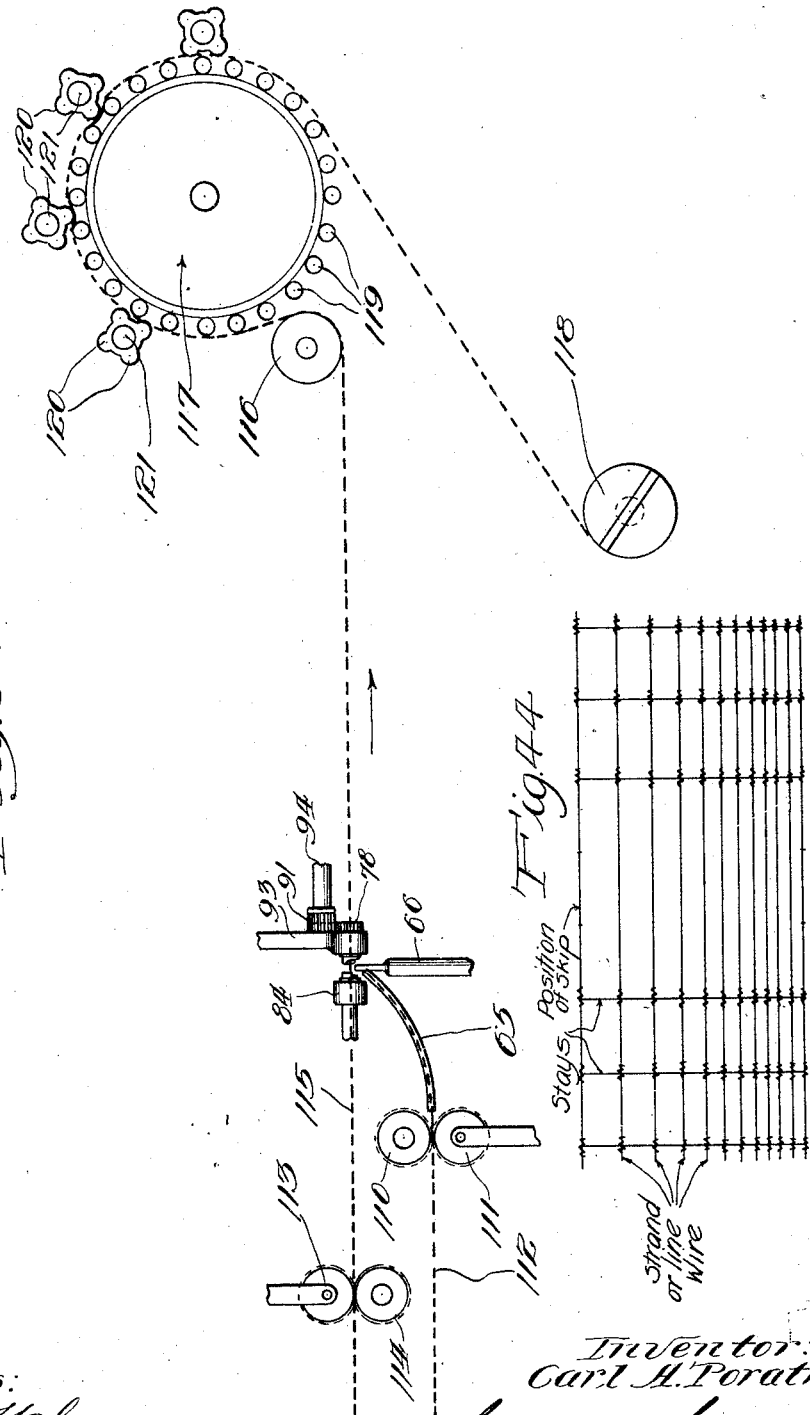

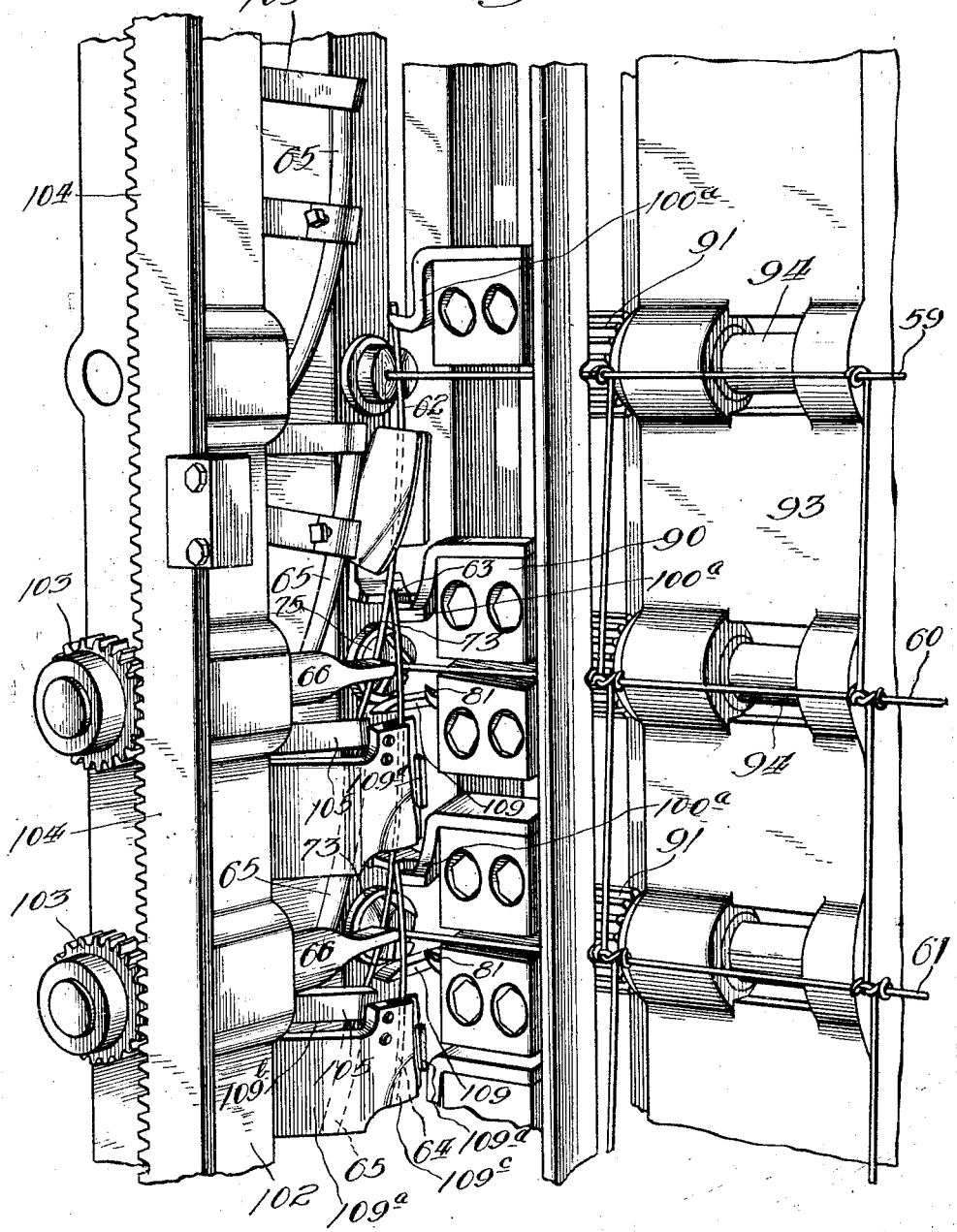

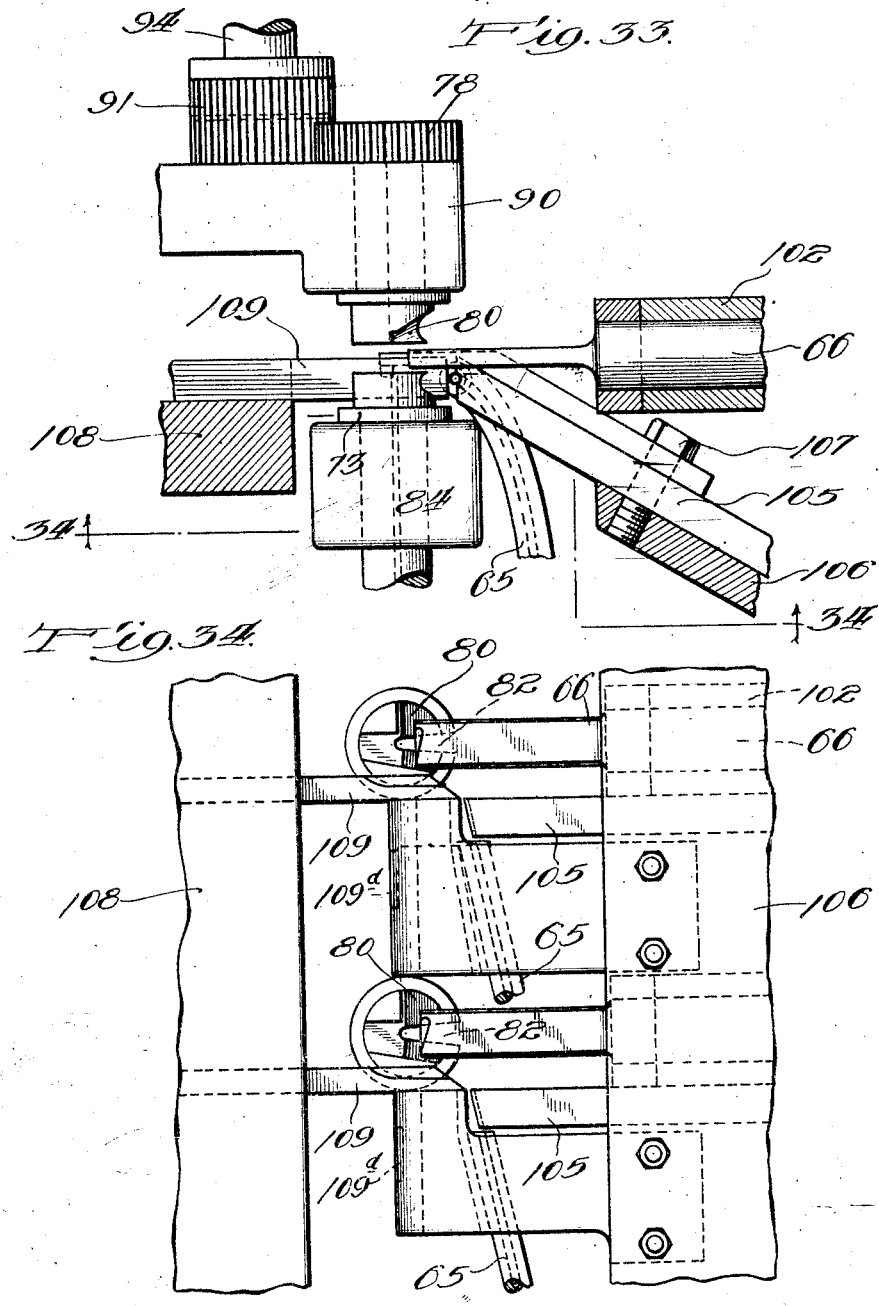

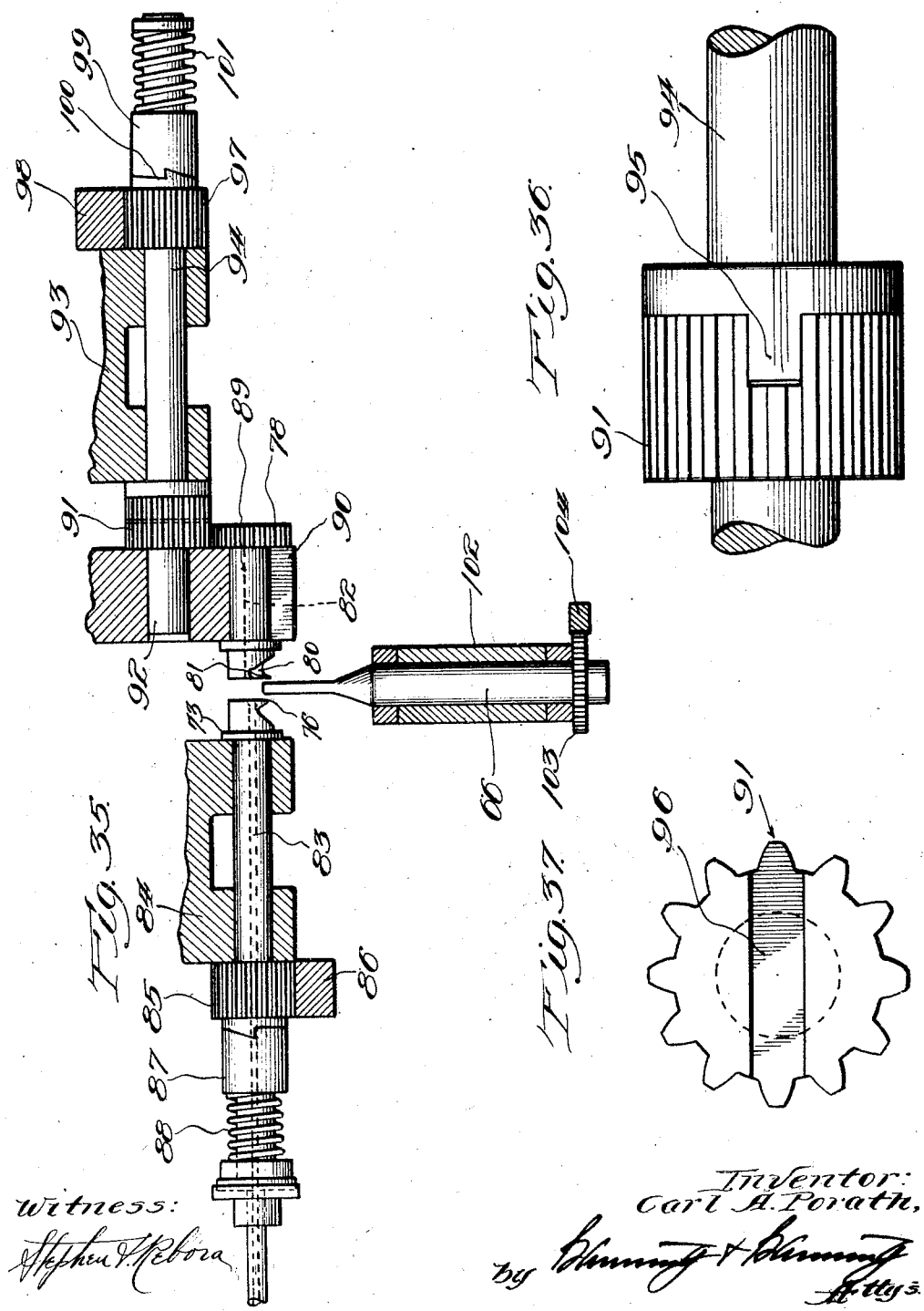

Nov. 13, 1928. 1,691,166
C. A. PORATH
WIRE FENCE MACHINE
Filed Feb. 14, 1924 22 Sheets-Sheet 21
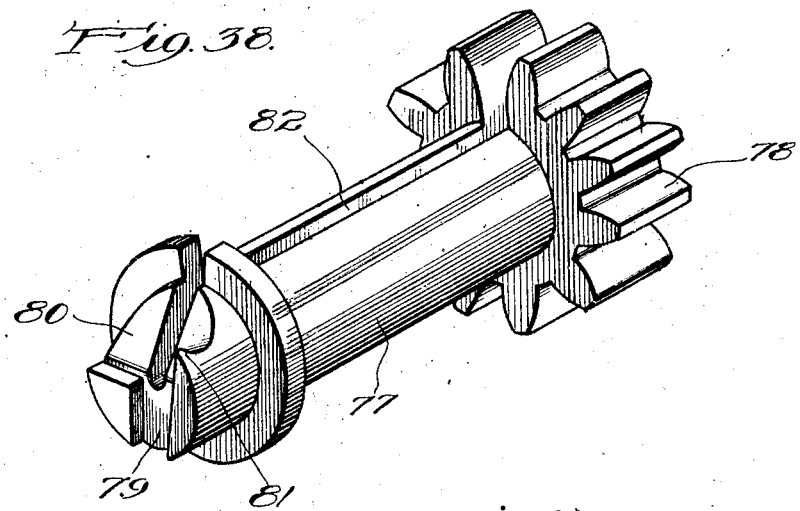
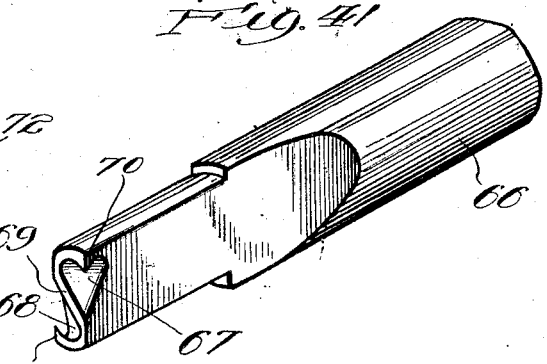
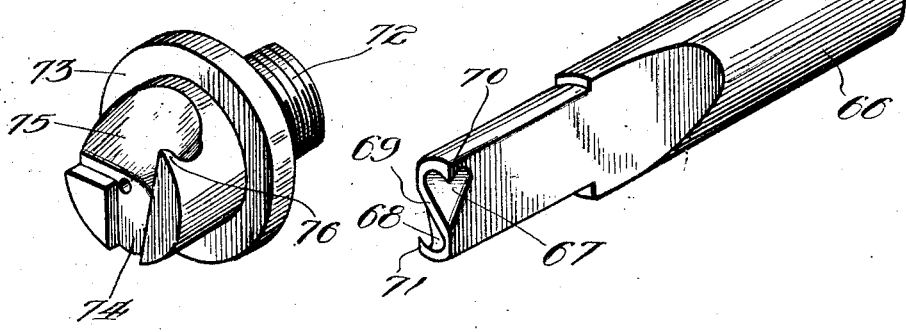
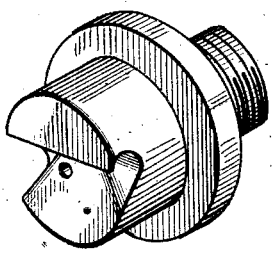
Inventor:
Carl A. Porath, Nov. 13, 1928.  
C. A. PORATH  
1,691,166  
WIRE FENCE MACHINE  
Filed Feb. 14, 1924  22 Sheets-Sheet 22
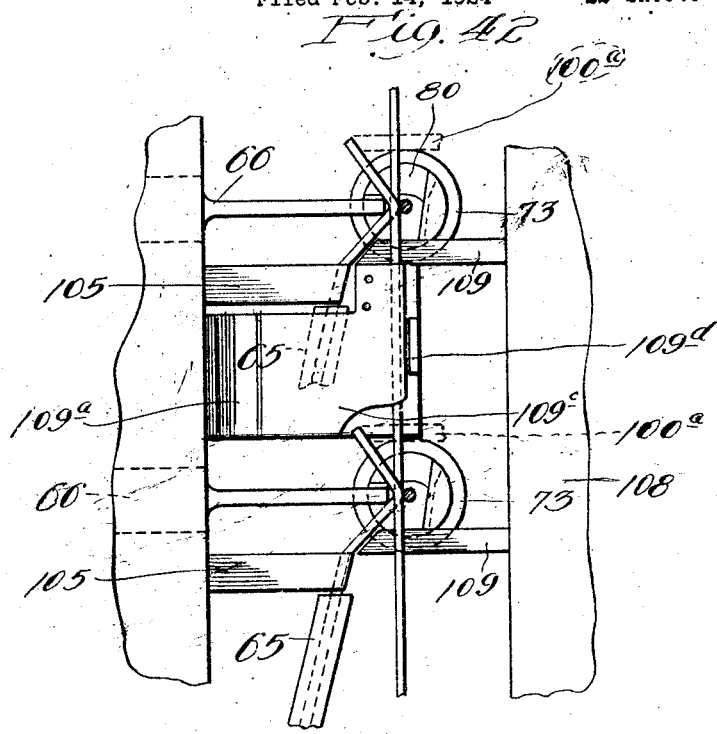
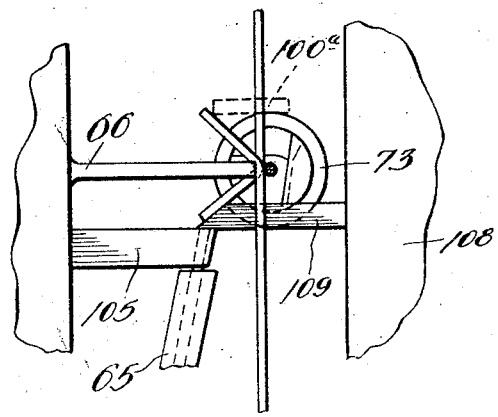
Inventor:  
Carl A. Porath,
Witness:

Patented Nov. 13, 1928.

1,691,166

UNITED STATES PATENT OFFICE.

CARL A. PORATH, OF KOKOMO, INDIANA, ASSIGNOR TO KOKOMO STEEL AND WIRE COMPANY, OF KOKOMO, INDIANA, A CORPORATION OF INDIANA.

WIRE-FENCE MACHINE.

Application filed February 14, 1924. Serial No. 692,646.

This invention has to do with certain improvements in wire fence machines and the like, and more particularly with wire fence machines for manufacturing that type of wire fence in which use is made of horizontally extending strand wires, together with vertical cross stay wires suitably connected to the strand wires at the points of intersection.

Still more particularly the machine is especially intended for manufacturing that style of wire fence which is disclosed in Letters Patent of the United States, Number 792,820, issued June 20, 1905, on the application of John E. Fredrick; but many of the features of the invention disclosed in the present application may also be used to advantage in connection with machines for manufacturing fencing other than that disclosed in the aforesaid Fredrick patent.

One of the objects of the present invention is to provide a construction of machine such that the stay wire sections may be fitted into place from a number of different spools with their end portions properly related, so that when the coiling devices are thereafter brought into operation these stay wires can be manipulated to the best advantage.

An object of the invention is to provide means for initially bending the overlapped end portions of the stay wires towards the strand wires while holding the stay wires and before the stay sections are severed. The stay wire is held until this bend is made by the primary twister. This insures that the stay wire will not creep and the distribution of the wire for twisting about the strand wire is even at all times. This will result in a very substantial saving of stay wire material. The stay wire section is not cut off until after this bend is effected.

A further object of the invention is to provide what I shall hereinafter designate as primary twisters for giving the adjacent cross ends of the stay wire sections an initial partial twist and after they have been bent towards the strand wires so as to bring said ends into position where they are most advantageously related for the subsequent coiling operations. In this connection a further object is to associate the cutting mechanism with the mechanism for operating the primary twisters so that the stay wire sections will be properly severed and in proper timed relationship with respect to the coiling operations.

A further object of the invention is to provide suitable coiling devices in conjunction with the primary twisters for coiling the end portions of the stay wires around the horizontal strand wires after the aforesaid primary twisting operation; and in this connection a further object is to so arrange these coilers that after they have completed their normal coiling operation they will be retracted from the line of travel of the strand wires and fencing, so that the fencing may be moved along to the next position with a very direct path of travel.

A still further object of the invention is to provide substantial improvements in the mechanism, whereby the fencing is drawn through the machine. In this connection, one object is to provide an improved construction of pull-out mechanism for exerting the necessary pull on the strand wires, and for insuring the proper gripping action on the strand wires without danger of damage to the stay wires.

A further feature of the invention relates to improvements in the mechanism for feeding the stay wires into place across the strand wires. In this connection, an object is to provide an arrangement whereby, if desired, the periodical feeding of the stay wires may be interrupted at the proper time after a certain length of fencing has been run through the machine so that the normal spacing of the stay wires will be discontinued. This discontinuance of the normal stay wire spacing will cause a gap or opening in the completed fence, which, when properly placed, will designate the end of a certain section of fencing.

In connection with the foregoing, it will be understood that the wire fencing is usually sold in lengths of a certain number of rods, as, for example, ten, twenty, thirty, or forty rods. The operations of the machine, however, are more or less continuous, and in those cases in which the stay wires are provided continuously throughout the entire length of the fencing it becomes necessary or desirable to remove the stay wires at the points where the fence is to be cut so as to leave a certain length of strand wires projecting at the cut end. The stay wires thus removed represent a loss to the factory in the sense of additional wire used for the unnecessary stay wires; and also represent a loss to the purchaser, both of first cost and labor in removing the strand wires themselves.

One of the objects of the present invention, therefore, is to provide a machine which may be set so that it will periodically skip or fail to place the stay wires after the desired length of fencing has been run, thus not only effectively marking the end of the length of fencing but also resulting in a substantial saving of material to the factory and labor to the purchaser.

A further object of the invention is to so arrange the machine that it may be adjusted to produce different lengths of fence sections as may be desired between the cutting points established, as above explained. For example, the machine may be so arranged that it can be adjusted to establish the lengths of ten, twenty, thirty, or forty rods, as desired, between the cutting points.

Still more particularly, in connection with the foregoing, it is an object to provide a very simple mechanism for accomplishing the foregoing results, which mechanism is electrically and mechanically controlled, and is of such a nature that the adjustment of the machine can be instantly changed from operation on one length of fencing to another.

Other objects and uses of the invention will appear from a detailed description of the same, which consists of the features of construction and combinations of parts hereinafter described and claimed.

In the drawings:

Figure 1 shows a side elevation of the left hand side of the machine looking at the machine from the position where the operator would normally stand;

Fig. 2 shows a side elevation of the right hand end of the machine when looking at the machine from the same side as Fig. 1; Figs. 1 and 2 are in fact two portions of a single relatively large elevation of the machine.

Fig. 3 is an end view looking at the left hand end of Fig. 1;

Fig. 4 shows a plan view corresponding to Figs. 1, 2, and 3;

Fig. 5 is a vertical cross section taken on lines 5—5 of Figs. 1 and 4 looking in the direction of the arrows;

Fig. 6 is a vertical cross section taken on the lines 6—6 of Figs. 1 and 4 looking in the direction of the arrows;

Fig. 7 is a fragmentary vertical cross section taken on the line 7—7 of Fig. 9 looking in the direction of the arrows;

Fig. 8 is a fragmentary detailed vertical view looking in the direction of the arrows 8—8 of Fig. 7.

Fig. 9 may also be considered as a fragmentary view looking in the direction of the arrows 9—9 of Fig. 4.

Fig. 16 is a longitudinal section taken on the line 16—16 of Fig. 17 looking in the direction of the arrows, and shows the tensioning mechanism on enlarged scale;

Fig. 17 shows a fragmentary horizontal section taken on the line 17—17 of Fig. 3 looking in the direction of the arrows, but on enlarged scale;

Fig. 18 shows a fragmentary plan view of one corner of the top of the machine, and shows the electrical contact box which controls the delivery of current to the mechanism, whereby the length of fencing section is controlled, being on enlarged scale as compared to Fig. 4;

Fig. 19 shows a cross section on the line 19—19 of Fig. 18 looking in the direction of the arrows;

Fig. 20 is a side view of the electric contact box, being taken on the line 20—20 of Fig. 18 looking in the direction of the arrows, but on enlarged scale;

Fig. 21 shows a fragmentary side view taken on the line 21—21 of Fig. 18 looking in the direction of the arrows, but on enlarged scale;

Fig. 22 shows a view similar to that of Fig. 20, with the exception that a portion of the cover plate has been broken away to show the interior operating mechanism;

Fig. 23 is a view at right angles to that of Fig. 22, the lower portion being broken away and in section. Fig. 23 may also be considered as a fragmentary section on the line 23—23 of Fig. 22 looking in the direction of the arrows;

Fig. 26 shows a fragmentary perspective view of a section of strand wire and the adjacent looped ends of the stay wires which are to be coiled thereon. This view shows the initial position of the stay wires just after they have been fed into place adjacent to the strand wire;

Fig. 27 shows the next position in the sequence of operations, in which the end portions of the stay wires have been twisted together approximately one-fourth revolution;

Fig. 28 shows the next operation in the sequence of movements, in which the end portions of the stay wires have been coiled around the strand wire so as to complete the knot;

Fig. 29 shows a section on the line 29—29 of Fig. 28 looking in the direction of the arrows;

Fig. 30 shows a view similar to that of Fig. 28 with the exception that it illustrates the attachment of the stay wire to one of the outside strand wires;

Fig. 31 shows diagrammatically the passage of the strand wire and fencing through the machine;

Fig. 32 shows a fragmentary perspective view of a portion of the twisting and winding mechanism in the position which it occupies when the stay wires occupy the initial position illustrated in Fig. 26;

Fig. 33 shows a fragmentary plan view of one of the sets of twisters, coilers and cutters in the initial position;

Fig. 34 shows a fragmentary section taken on the line 34—34 of Fig. 33 looking in the direction of the arrows;

Fig. 35 shows a fragmentary longitudinal section through one set of coilers and twisters in their initial position;

Fig. 36 shows a side view of the sliding connection between the driving mechanism and the gear for driving one of the coilers;

Fig. 37 is an end view of the gear illustrated in Fig. 36;

Fig. 38 is a perspective view of the movable coiler;

Fig. 39 is a perspective view of the coiler which is a companion to that of Fig. 38;

Fig. 40 is a perspective view of one of the companion coilers modified for the conditions existing at the top or bottom strand wire;

Fig. 41 is a perspective view of one of the primary twisters;

Fig. 42 is a fragmentary elevation of two consecutive coilers and adjacent stay wires in the position which the parts occupy at the moment when the stay wires have been placed in position but before cutting off;

Fig. 43 is a partial view corresponding to Fig. 42, but after cutting off the stay wire section; and Fig. 44 shows diagrammatically a length of fencing made on the machine.

Figure 9:
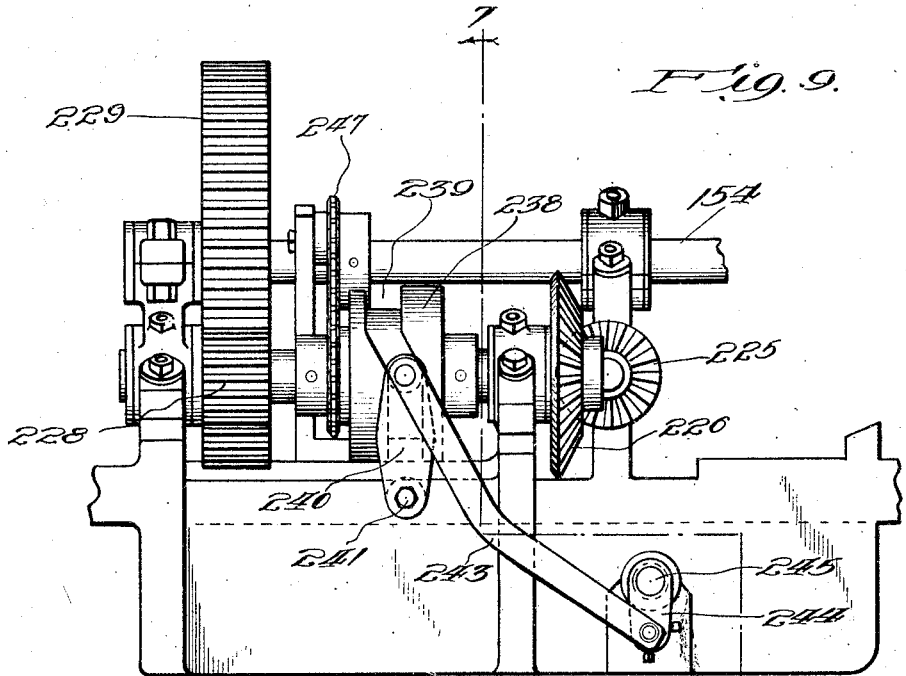
Fig. 9 is a fragmentary vertical elevation looking in the direction of the arrows 9—9 of Fig. 7.

In order that the coiling and twisting operations may be more clearly understood and the general nature of the machine better appreciated, I will first have reference to Figs. 26–30 inclusive, in which the various operations in connecting the stay wires to the strand wires are illustrated in perspective. In Figs. 26, 27, 28 and 29, one of the strand wires for the adjacent portion of the fence is designated by the numeral 50. The two adjacent stay wires are designated by the numerals 51 and 52 respectively. As they are initially fed into place their end portions 53 and 54 respectively are caused to project a certain distance across the position of the strand wire 50, and said end portions lie about one inch in advance of the position of the strand wire. Furthermore the upper end of each stay wire lies against a stop or lug 100$^a$ so that when the stay wire is forced back it will be bent sharply as shown in Figs. 43 and 42. Also a stationary cutter 109 has its end about one inch in advance of the strand wire so that it supports the stay wire at such point. When the ends of the stay wires have been crossed and supported by the lug 100$^a$ and the stationary cutter respectively, the primary twister moves towards the strand wire carrying the stay wires with it and at the same time the primary twister is turned sufficiently to firmly engage the ends of the stay wires. When the primary twister has advanced sufficiently to carry the stay wires against the strand wire the cutter is actuated and the full quarter turn of the primary twister is then completed so that the crossed ends of the stay wires occupy substantially the position of Fig. 27 wherein it will be noted that they are hooked together as shown at 55. This hooked portion lies in front of the strand wire 50 but the stay wire end portions 53 and 54 have been brought into a position where the operation of the coiling mechanism will cause said end portions to be properly coiled about the strand wire without disarrangement of the position of the hooked portion 55.

The next operation consists in twisting the end portions 53 and 54 around the strand wire, as shown in Fig. 28, so as to complete the knot. When this has been done, the attachment of the stay wire to the strand wire is completed, and the knot is to be released from the twisting and coiling mechanism.

Before explaining the nature of the twisting and coiling mechanism I will first refer to Fig. 30, in which is illustrated the twisting attachment of one of the stay wires to the adjacent edge strand wire. In this case the end portion 56 of the stay wire 57 is simply twisted around the edge strand wire 58, since there is no companion stay wire to be brought into the combination.

Referring next to Figs. 32 to 41 inclusive, I will state that in Fig. 32 there are illustrated three strand wires, designated respectively 59, 60, 61. Each of these wires is moved through the machine from left to right by an intermittent movement, and the stay wires are attached during the pauses or periods of rest in accordance with the general knotting operations already explained. The stay wire sections adjacent to the strand wires 59, 60, 61 are designated 62, 63, 64, respectively, and each of these stay wires is fed into position through a curved tubular guide 65, as illustrated in Fig. 32. Examination of Fig. 31 shows one of these guides, and shows that the stay wire itself is thereby changed from a direction of movement parallel to the strand wire to a direction across and at right angles to the strand wire.

By the use of suitable stay wire feeding mechanism presently to be explained the stay wires are all fed simultaneously by forcing them through their respective tubes 65 until they lie entirely across the space between two of the strand wires and are in fact projected a sufficient distance beyond the respective strand wires so as to overlie the same the necessary distance to allow for the proper coiling operation. Furthermore, each of the curved guides 65 terminates beneath the appropriate strand wire a sufficient distance so that the cutting mechanism may be operated between the strand wire and the end portion of the curved guide, and still allow a sufficient length of the stay wire to remain exposed for the coiling operation at that end.

After the stay wires have been fed into place they are next subjected to the action of a primary twister illustrated in Fig. 41. This primary twister includes a shank 66 having on its inner end a pair of oppositely facing notches 67 and 68 which are cut back from its end portion 69 at an angle of substantially forty-five degrees (45°) so as to expose the oppositely facing corner hooks 70 and 71 respectively. Examination of Fig. 26 and comparison of the same with the primary twister of Fig. 41 will show that by forcing the end portion of the primary twister against the end portions of the stay wires and then turning the twister through substantially one-fourth turn, the ends of the stay wires will be interhooked, as shown in Fig. 27. The position which these primary twisters occupy with respect to the stay wire guides is well illustrated in perspective in Fig. 32.

The strand wires, as they are moved through the machine, pass through what I will call fixed coilers, such as illustrated in Figs. 39 and 40 respectively. Coilers such as shown in Fig. 39 are used for the body strands of the fence, and coilers such as shown in Fig. 40 are used for the top and bottom strands. Each of the body coilers includes a shank 72 preferably provided with a flange 73 and having on its front or exposed face a cross groove 74. The stay wire, when initially fed into place, occupies a position in or immediately adjacent to this groove 74, as will be apparent from an examination of Fig. 32. The opposite side of the coiler is cut back, as shown at 75, and at the upper end of the groove 74 there is formed a hook portion 76 which faces in the direction in which the coiler is to be turned to perform its operation.

Opposite to each of these so called fixed coilers is a movable coiler, one of which is shown in perspective in Fig. 38. It includes a shank 77 having at one end a gear 78 by which it can be driven, and having at its other end a coiling head which is in fact a companion to that illustrated in Fig. 39. This coiling head is similarly provided with a transverse gear 79, the cut away portion 80, and hooked corner portion 81.

While I have spoken of these coilers as being fixed and movable respectively, still it will be understood that as a matter of fact they are both movable in the sense that they both rotate to perform their coiling operations. Examination of Fig. 38, however, shows that the so called movable coiler has a longitudinally extending slot 82 which extends throughout the length of the shank 77 and also through the gear and the coiling head itself, said slot reaching slightly more than half way across the coiler. This movable coiler is carried by a table or block presently to be explained, by means of which it can be shifted sidewise while retaining its journalled condition and also its proper meshing engagement with a driving connection. When this movable coiler is shifted sidewise into the operating position, the strand wire is accommodated within the slot 82, and at such times said coiler can be rotated to assist in forming the knot; but by again shifting this coiler sidewise it slips away from the strand wire and is completely disengaged therefrom, so that the fence can then be shifted lengthwise, and the stay and knot, which have just been placed, can travel past the position which was thus vacated by the sidewise movement of the movable coiler.

Reference to Fig. 35 shows the relationship of the primary twister and the fixed and movable coilers more in detail. Each of the fixed coilers is connected into a shank 83 which is journalled within a vertical block or table 84. In the normal operation of the fixed coilers they are given two complete revolutions in the placing of the knot. A pinion 85 is loosely mounted on the outer end of the shank 83 and engages a vertical rack bar 86, which can be reciprocated back and forth in a manner to be presently explained.

A clutch block 87 is keyed to each of the shanks 83 and is normally spring-pressed against the clutch face on the pinion 85 by means of a spring 88. The clutch faces are such that on the downward movement of the rack bar 86 the pinion will be driven in the forward direction and will communicate rotation through the clutch to the shank 83 and turn the coiler in the proper direction. On the other hand, when the rack bar is again raised and turns the pinion 85 backwards, said pinion will slip past the clutch block 87 and will not turn the shank and coiler backwards.

Each of the movable coilers is carried by a shank 89 journalled within a block or table 90 which can be reciprocated back and forth. This block 90 is also provided with a horizontal opening or recess in line with the journalled shank 89, as shown in Fig. 32, so that when the block 90 is shifted backwards to carry the movable coiler and shank away from the completed fencing the strand wire can slip through the slot of the block 90 as well as the slot of the shank, and thus be completely disengaged.

The pinion 78 meshes with another pinion 91 on a stub shaft 92 which is carried by the movable block 90, these parts being constantly in mesh. Adjacent to the pinion 91 is located a fixed block 93 which carries a shaft 94 in line with the operating position of each of the stub shafts 92. Each shaft 94 has on its end a transverse tongue 95 which engages a transverse groove 96 of the corresponding gear 91, and thus maintains a driving connection between the parts. When the shafts 92 and 94 are in alignment, as shown in Fig. 35, which is the operating position for rotating the movable coiler, the tongue and groove connection is effective to establish the driving relationship. When the coiling operation is completed, the tongue and groove stand in the horizontal position, so that the table 90 can then be shifted backwards the necessary distance to free the completed fencing, as already explained.

Freely mounted on each of the shafts 94 is a pinion 97; and a vertically reciprocable rack bar 98 engages the pinions 97. A clutch block 99 is keyed to each of the shafts 94 and has a clutching face 100 adapted to engage a clutching face on the adjacent pinion 97 for driving the shaft 94 in the proper direction to rotate the movable coiler during the coiling operation. Each clutch block 99 is spring-pressed into clutching position by the spring 101, but can disengage on the back stroke of the rack bar 98.

The shanks 66 of the primary twisters are mounted within a vertical table 102 which can be reciprocated back and forth as presently to be explained. Each of these shanks 66 carries on its outer end a pinion 103, and the vertically reciprocable rack bar 104 engages the pinions 103, so that reciprocation of said rack bar turns the primary twisters.

The table 102 normally stands away from the position of the coilers a sufficient distance to allow the stay wires to be freely fed into place and without interference by the primary twisters. Immediately afterwards, the table 102 is moved towards the coilers so as to carry the heads of the twisters against the end portions of the stay wires, this relationship being readily understood from Fig. 32. This brings the corners 70 and 71 of the twisters into proper engagement with the end portions of the stay wires, so that by turning the twisters the proper relationship will be established between the ends of the stay wires. The stay wire sections must be cut off before the twisting and coiling operations can be properly performed. At the same time the exposed end portions of the stay wires must be supported with sufficient firmness to maintain their proper position during and immediately after the cutting operation. For this purpose I provide a stationary cutting bar 105 adjacent to the position of each primary twister, the fixed cutting bars 105 being carried by a stationary table 106. These bars 105 preferably slant sidewise, as clearly shown in Fig. 33, so that they effectively clear the primary twisters and the table which carries the twisters. The fixed cutters 105 may be adjusted in position on the table 106 by loosening the set screws 107, as will be readily understood.

Behind the position of the coilers is located another movable table 108 which carries a companion cutter 109 corresponding to each of the fixed cutters just referred to. The table 108, when shifted towards the stationary cutters, will cause the movable cutters 109 to shear the stay wires at the proper position.

The table 102 which carries the primary twister shanks 66 is moved towards the cutting knife table 108 simultaneously with the movement of the latter. The movement of these parts is so timed that the ends of the primary twisters are forced firmly against the overlapped exposed ends of the stay wires just before the shearing action commences; and the shearing is then performed just before the primary twisters are turned. This sequence of movements makes it certain that the overlapped ends of the stay wires will be properly engaged by the primary twisters and held in the proper position during the shearing operation, so that when the primary twisters are afterwards turned they will properly perform their function. The primary twisters remain on the wire while coilers make one revolution then pull out and turn 90° while away from coilers.

As shown in Figs. 32, 42 and 43 in particular, there is a stationary guide 109ª in position to receive each stay wire as the same is fed into place. Each guide 109ª has a vertical slotted passage 109ᵇ through which the stay wire is projected as it is fed into place. The lower end 109ᶜ of each passage 109ᵇ is flared so as to better ensure the entrance of the stay wire thereinto. The slotted passages are open on the side to allow the strand wires to move sidewise as the fencing is advanced after the coiling operations are completed; and a lug 109ᵈ is placed adjacent to each of the slotted passages so as to keep the stay wires in proper form and prevent excessive bowing during the operations.

The strand wires, after being operated upon, are moved towards the right, in Fig. 31, so as to wind up the completed fencing, and also to crimp it in the manner to be presently explained. In association with this movement, the proper tension is placed on the strand wires so as to hold them against displacement and against any sagging or uneven position. There is also provided suitable feeding mechanism for feeding forward the stay wires for the purpose already explained.

Referring to Fig. 31, there are illustrated the rollers 110 and 111 in engagement with the stay wire 112, and other rollers 113 and 114 in engagement with the strand wire 115. The rollers 110 and 111 are so arranged that they engage the stay wire, and upon being turned they feed the same through the proper distance to place the required length of stay wire in position across the strand wires. The rollers 113 and 114, however, are more in the nature of hold-backs, or tension rollers. The completed fencing, after leaving the knotting mechanism, passes over a cylinder 116, and then over a drum 117, and finally to the winding spool 118. This winding spool may be driven positively after the knotting operation is completed so as to pull through the required length of fence depending upon the normal spacing of the stay wires. The drum 117 is preferably provided with a series of vertical bars 119 which are separated a sufficient distance to allow the vertical lugs 120 of a series of crimping rolls 121 to crimp the strand wires as the fence is drawn around the drum 117.

Referring to Figs. 2 and 4 in particular, each of the crimping rolls 121 is provided with a pinion 121ª; and the drum 117 carries a gear 117ª engaging said pinions so as to rotate the crimping rolls in harmony with the drum rotations.

Referring particularly to Figs. 16 and 17, I have shown in detail the arrangement of the rolls 110 and 111 and 113 and 114 respectively. The form illustrated in Figs. 16 and 17 has reference particularly to the rolls for the stay wires, since these also act as feeding rolls. Referring to Fig. 1, as well as Figs. 16 and 17, there is provided a vertical shaft 122 which may rotate within fixed journals in the frame of the machine, being intermittently driven by a pinion 123 at its upper end, as will be presently explained. On the shaft 122 is located a series of gears 124 corresponding to the positions of the various stay wire feeds. A disk 125 is secured to the hub 126 of each of these gears and is driven therewith.

Adjacent to the position of the shaft 122 is located a stationary table 127, best shown in Fig. 3, and also shown in section in Fig. 16. This table is horizontally slotted, as shown at 128 in Fig. 17, in line with each of the feeding disks 125; and a block 129 is slidably mounted in each of the slots 128 aforesaid. Each of the blocks 129 carries at its outer end another block 130, by means of a pair of dowel pins 131 and 132; and the block 130 in turn has journalled within it a gear 133 meshing with the companion gear 124. Threaded to each gear 123 is a disk 134 which is a companion to the corresponding disk 125. The table 127 is provided with a transverse spring 135 corresponding to each of the blocks 129, said spring passing through a slot 136 in the block 129. One end of each spring is mounted on a pin pivot adjusting screw 137, which can be adjusted with respect to the table, and the other end of each spring 135 is engaged by a pressure shoe 138 on a lever 139 which is pivoted to the table 127 at the point 140. This arrangement permits the disks 125 and 134 to be forced together under spring pressure at all times, while at the same time both of said disks are drivingly connected by the gears 124 and 133.

The disks are provided with companion encircling grooves 141 and 142 and 143 and 144, respectively, within which the stay wires are gripped as the disks rotate. In case of wear of one set of grooves, or for any other reason, the other set of grooves may be used. For example, one set of grooves might be made of larger size than the other so as to better accommodate stay wires of different sizes.

It will be noted that by throwing the levers 139 over, the pressure of the springs 135 is released and the disks will be allowed to release the stay wires. In order to positively disengage the parts, a lever or bar may be inserted into the opening 145 within the projecting ear 146 of each of the blocks 129, as desired.

The construction of the tensioning rolls 113 and 114 is in general similar to that just described. Owing, however, to the fact that the feeding of the strand wires and fencing is performed by the rotation of the spool 118, it is unnecessary to drive the tensioning devices, and they serve simply to place the strand wires under the necessary amount of tension.

Figure 25:
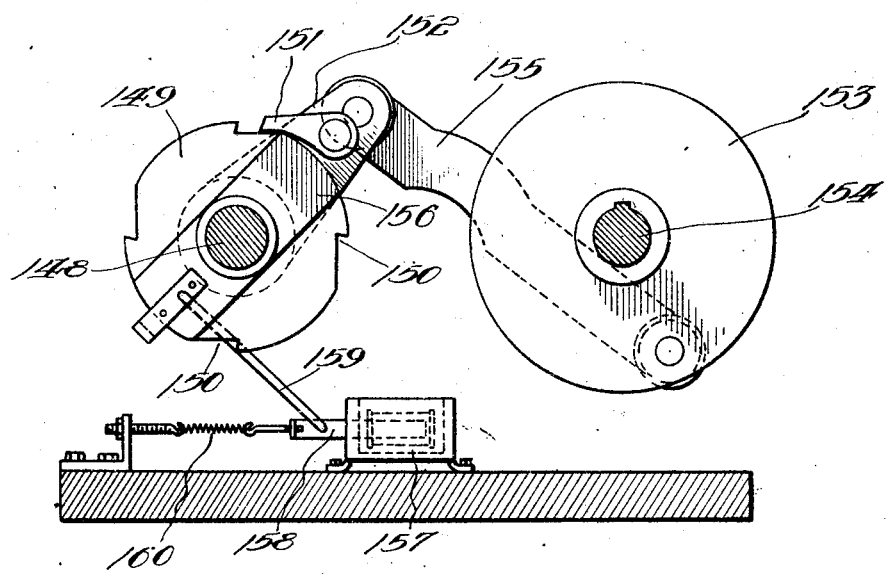
Fig. 25 is a vertical section taken on the line 25—25 of Fig. 24 looking in the direction of the arrows.

The bevel gear 123 on the upper end of the shaft 122 meshes with a bevel gear 147 on a horizontal shaft 148 journalled in the upper portion of the machine. The shaft 148 carries at one end a notched disk 149, the notches 150 whereof may at times be engaged by a pawl 151 carried by a reciprocating arm 152 which is journalled on the shaft 148. The arm 152 in turn is connected to a disk 153 on a shaft 154 by means of a link 155, so that each time the shaft 154 rotates the arm 152 is oscillated. The shaft 154 also operates certain other devices in timed relationship, with respect to the feeding of the stay wires. In order to make sure that these other devices shall be in such a position as to not interfere with the feeding of the stay wires the movements of the pawl 151 and disk 149 are properly timed with respect to the rotations of the shaft 154. This timing is secured by causing the pawl 151 to overthrow as will be evident from Fig. 25. Therefore, in the normal operation of this device, the stay wires will be caused to feed each time the shaft 154 is rotated. The shaft 154 is properly timed with respect to the pull-out mechanism, so that the stay wires are normally spaced apart the proper distance on the strand wires. I have, however, provided mechanism for interfering with the proper engagement of the pawl 151 with the ratchet 149, so that when this interference takes place the stay wires will not be fed, but the mechanism will pull through a section of fence without the proper timing and placing of the stay wires. In fact, the machine herein illustrated is so arranged that when the section or length of fence has been completed the pawl 151 is caused to miss the ratchet 149 on two consecutive strokes, so that there is moved through the machine by the take-up mechanism a length of fence equal to three of the usual spacings without having any stay wires in such length. If, for example, the normal spacing between stay wires is six inches this space will be increased to eighteen inches at the end of the section of fencing. The interference with the operation of the pawl 151 is occasioned by means of a gear 156, which is pivotally mounted on the shaft 148 and which when turned away from the position shown in Fig. 25 will effectively cover one of the notches of the disk 149 and prevent the pawl from engaging the same.

A solenoid 157 is mounted on the frame of the machine, its armature 158 being connected to the gear 156 by means of a link 159. A spring 160 normally returns the armature 158 to the non-interfering position, but when the solenoid is energized the interfering position is resumed.

Referring particularly to Figs. 2 and 4, the crimping drum is carried by a vertical shaft 161, on the upper end of which there is placed a bevel gear 162, and the shaft 161 also carries a gear 163 which meshes with a pinion 164 at its side. The pinion 164 is mounted on a vertical shaft 165, which best appears in Figs. 2, 4, 18 and 19. On this shaft 165 is placed a cam plate 166 having the raised cam surface 167 around a portion of its periphery. The shaft 165 also carries a worm 168 which meshes with a worm gear 169 on a shaft 170. This shaft 170 or an extension thereof reaches into a housing designated in its entirety by the numeral 171; and within said housing the shaft 170 carries a series of gears 172, 173, 174 and 175 respectively. These gears are of graduated sizes. In the particular arrangement illustrated a clutch 170ª is placed in the line of the shaft 170, so that the section of shaft within the housing 171 can be turned with respect to the portion of the shaft outside of said housing. Also a hand wheel 170ᵇ is placed on the extreme end of the shaft beside the housing 171, so that said shaft can be easily turned for adjustment. This makes it possible to properly time the spacing operations with which the mechanism is associated. Within the housing 171 and alongside of the shaft 170 is another shaft 176 upon which are mounted companion gears 177, 178, 179 and 180 respectively. It will be noted that, owing to the difference in the gear ratios, the gears 177, 178, 179 and 180 will rotate at different speeds.

Each of the gears 177, 178, 179 and 180 carries a disk 181 having on its periphery a projection or cam surface 182; and within the housing 171 there is placed a plunger or pin 183 in line with each of these disks 181. Each plunger 183 is normally spring-pressed inward by a spring 184, which projects to the outside of the casing, where it engages a finger 185 pivoted at the point 186 and normally held against the pin 183 by a spring 187. Each of the fingers 185 carries at its upper end a contact point 188 which is spring-pressed by a spring 189, and in line with each of the points 188 is a stationary electrical contact 190 carried by an insulating block 191.

From the construction thus far described it will be apparent that, as the take-up drum rotates, the disks 181 are simultaneously rotated but at different speeds, so that the amount of rotation of the take-up drum necessary to harmonize with the rotation of one of the disks 181 is different from that to harmonize with the rotation of the other of said disks. In like manner the amount of rotation of the take up drum which will be accomplished between two successive contactings of the points 188 with their respective contacts 190 will depend upon which one of said points and contacts is being considered. I will here mention that electric circuits are established which include the solenoid 157 and these points and contacts, so that the frequency with which the solenoid will be energized as compared to the rotation of the take-up device will depend upon which one of the contacts 190 is supplying the current and in electric connection with the solenoid.

Figure 10:
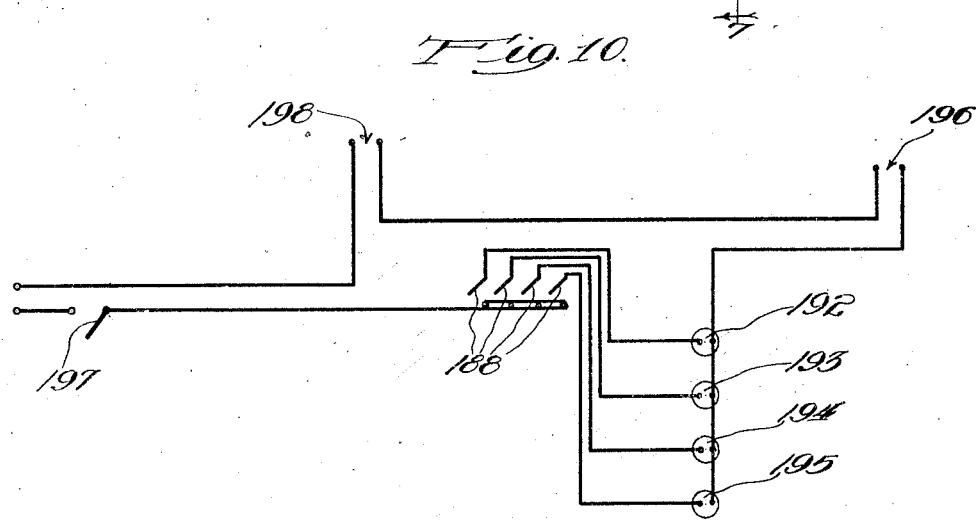
Fig. 10 is a fragmentary wiring diagram of certain of the electrical connections for use with the knock-off mechanism which regulates the length of fencing sections manufactured.
Figure 11:
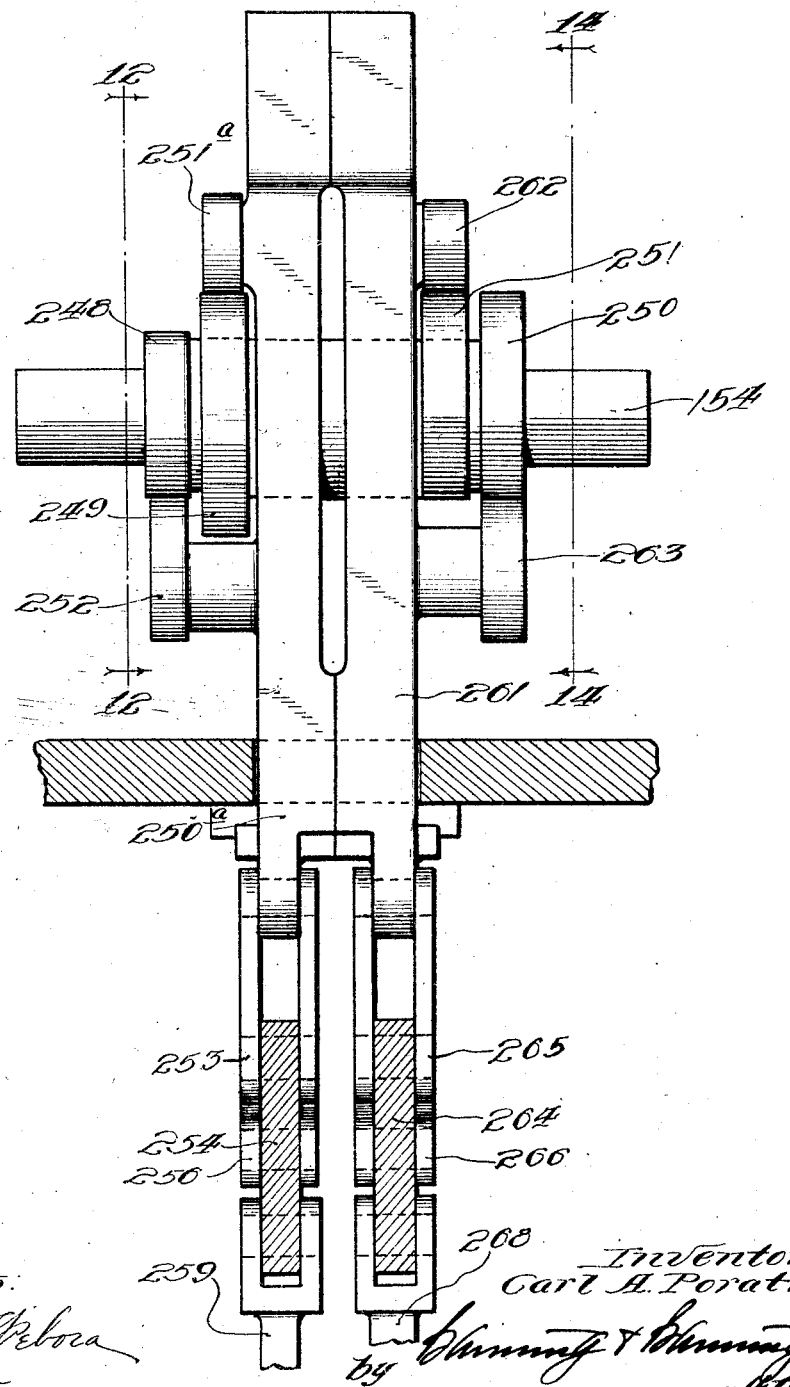
Fig. 11 is an edge view of certain of the cam mechanisms, on enlarged scale, being taken on line 11—11 of Fig. 5 looking in the direction of the arrows.
Figure 12:
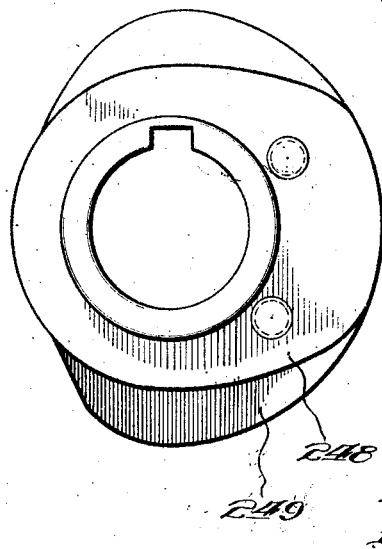
Fig. 12 is a face view of the cams for operating the mechanism for shifting the position of the coilers, being taken on the line 12—12 of Fig. 11 looking in the direction of the arrows, but on enlarged scale.
Figure 13:
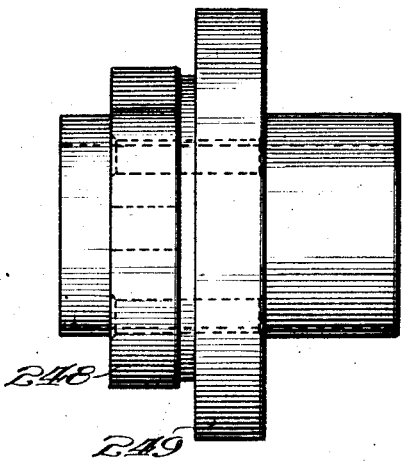
Fig. 13 is an edge view corresponding to Fig. 12, being taken on the line 13—13 of Fig. 12 looking in the direction of the arrows.
Figure 14:
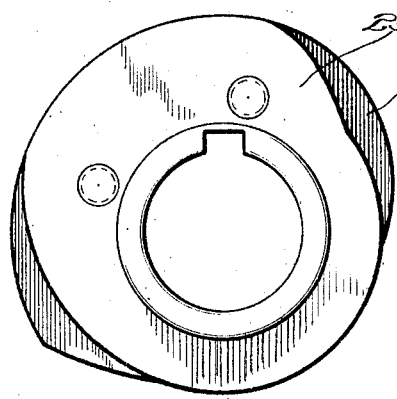
Fig. 14 is a face view of the cams for operating the primary twisters and cutters, being taken on the line 14—14 of Fig. 11, but on enlarged scale.
Figure 15:
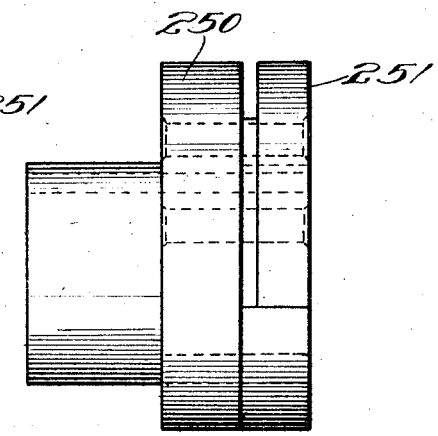
Fig. 15 is an edge view corresponding to Fig. 14, being taken on the line 15—15 of Fig. 14 looking in the direction of the arrows.
Figure 24:
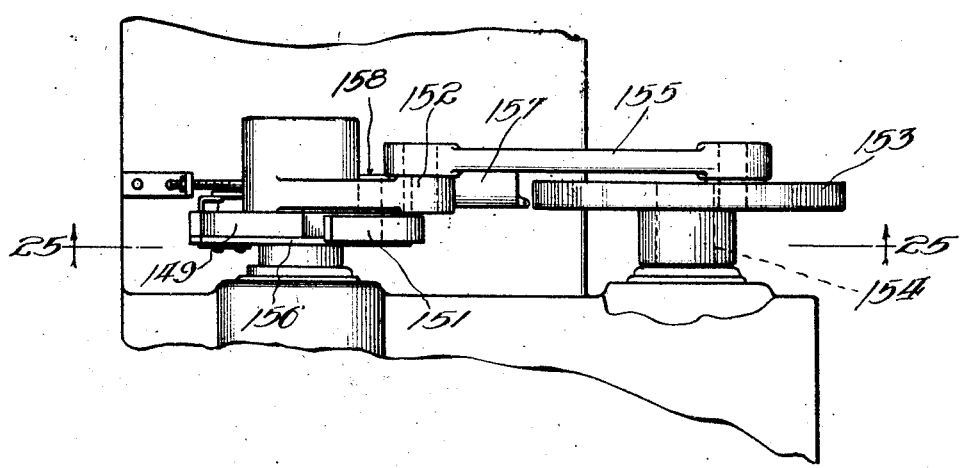
Fig. 24 shows a fragmentary plan view of the shield device whereby the length of fencing section is regulated; it may also be considered as a fragmentary view looking down on the end portion of Fig. 4, but on enlarged scale.

At a convenient position on the frame of the machine is placed a series of electric sockets 192, 193, 194 and 195, into any one of which may be inserted a circuit closing plug as desired. The contact points 188 are illustrated in Fig. 10 diagrammatically. At one point in the circuit, designated 196, is connected the solenoid 157, and at another point in the circuit is placed a controlling switch 197, and at another point in the circuit there is placed a contacting device designated by the numeral 198 in Fig. 10. This contacting device is illustrated in detail in Figs. 18, 19 and 21. Adjacent to the cam 166 previously referred to is placed a swinging arm 199 mounted on a shaft 200, so that said arm can rise and fall. This arm carries at its free end a roller 201 which is adapted to engage the cam 166.

Upon the shaft 170 already referred to is placed a disk 202 having a series of peripheral notches 203, as clearly shown in Fig. 19. The shaft 200 also carries a finger 204 having at its upper end a lug 205 which normally engages the peripheral portion of the disk 202, but which is allowed to drop into one of the notches 203 if the same happens to be in register with the lug 205 at the time the roller 201 is released by the cam 166.

Adjacent to the arm 199 is a contact finger 206, best shown in Fig. 21. This contact arm is pivoted at the point 207 and its free end is placed beneath the arm 199, so that when said arm is depressed the contact arm 206 will also be depressed against the force of its spring 208. The contact arm 206 carries a contact 209 which will engage a stationary contact 210 when the arm 206 is depressed so as to close the electric circuit at the point 198 of the diagram of Fig. 10. A spring 211 normally draws the arm 204 over, so as to carry the lug 205 into the notches 203, but this is resisted by the engagement of the roller 201 with the cam 166.

Assuming that the machine is intended for the production of fencing in lengths of ten, twenty, thirty, or forty rods, respectively, the proper socket, 192, 193, 194, or 195, will be selected according to the length of fencing sections are to be produced. Assuming, for example, that it is desired to produce twenty rod sections, the plug will be placed in the proper socket, say 193. Each time the take-up mechanism rotates a distance corresponding to ten rods, the disk 202 will complete a quarter revolution and carry one of the notches 203 into alignment with the lug 205. This registration will take place while the roller 201 is supported above the lower mutilated portion of the cam 166, so that as soon as the registration takes place the lug 205 will drop into the corresponding notch 203 and allow the electric circuit to be closed by the contact 209. If, at the same time this takes place, the corresponding pin 183 is pressed outward by the proper cam 181, the circuit will be completely closed and the interference with the feed of the stay wire will be brought about. If, however, this harmony of contacts does not exist, the roller 201 will be picked up by the cam 166, and the arms 199 and 204 will be tilted so as to carry the lug 205 away from the notch of the disk 202 and open the circuit at the point 198. The next time a quarter revolution of the disk 202 takes place the contact 206 will again be brought together, and this time, if the proper harmony of circuits is established, bearing in mind the relative frequency of projection of the pins 183, the circuit will be closed through the solenoid, and the feeding of the stay wires will be interfered with so as to create the desired blank space in the length of fencing.

The spool 118, onto which the completed fencing is eventually wound, is mounted on a shaft 212, best shown in Fig. 2. This shaft 212 carries at its upper end a drum 213 having the downwardly depending flange 214. A sleeve 215 surrounds the shaft 212 and carries a pinion 216 by which it is driven. Driving shoes 217 are drivingly connected to the sleeve 215, and a wedge block 218 is slidably mounted on the sleeve 215 so that, by raising said wedge block, the pressure exerted by the shoes 217 of the flange 214 may be adjusted. The wedge block can be raised by drawing down a pin 219 against the force of the spring 220 and by means of a hand wheel 221. In this way the tension exerted by the spool can be regulated as desired.

I will now describe more in detail the driving mechanisms, by means of which the various parts so far explained are driven in proper harmony.

For purposes of convenience, there is provided a common driving shaft 222 located on the upper portion of the machine, having thereon fast and loose pulleys 223 and 224, respectively. The shaft 222 carries at its rear end a bevel pinion 225 which meshes with the bevel gear 226 on the shaft 227, which shaft carries a spur gear 228 which meshes with another spur gear 229 on the longitudinally extending shaft 154 previously referred to, which I will term the main shaft.

A spur gear 230 on the main shaft meshes with another spur gear 231 on a stub shaft 232. The spur gear 231 carries a crank pin 233 which connects by a link 234 with the upper end of the rack bar 98, which has already been referred to, so that said rack bar 98 is raised and lowered once for each revolution of the spur gear 231. Alongside of the upper end of the rack bar 99 is another shaft 235 carrying a spur gear 236, so that the shaft 235 is caused to oscillate by the up and down movements of the rack bar 98. The shaft 235 also carries another spur gear 237 which meshes with the rack bar 86 previously referred to, so that both of these rack bars are moved in proper timed relationship to insure the proper timing and relative movements of the fixed and movable coilers.

Loosely mounted upon the shaft 227 is a drum 238 having a cam groove 239 in its periphery. A short lever 240 is pivoted to a stationary part at the point 241, and has a roller 242 working in the groove 238 of the drum. Connected to the roller 242 is also a link 243 which connects to the crank 244 on a shaft 245 extending through the machine. The arrangement is such that each time the drum 238 completes a revolution the shaft 245 is oscillated back and forth.

On the back end of the shaft 245 is a segmental gear 246 which meshes with teeth on the upper end of the rack bar 104, so that said rack bar is raised and lowered each time the shaft 245 is oscillated. In this way the primary twisters are turned to perform their proper functions. The drum 238 previously referred to is driven from the main shaft 154 by a chain drive 247, as clearly shown in Fig. 4 in particular.

The main shaft 154 carries two pairs of cams, designated 248 and 249, and 250 and 251, respectively. The cams 248 and 249 serve to raise and lower a bar 250ª through the medium of rollers 251ª and 252, the bar 250ª in turn being connected to a link 253, which in turn is connected to a block 254 pivoted for oscillation on the center 255. As this block 254 is raised by the link 253 it exerts a sidewise pressure through the medium of another link 256 on the upper portion of the table 90 which carries the movable coilers already referred to. Another toggle block 257 is pivoted at the point 258, and is also connected to the block 254 by a link 259, so that the two toggle blocks are raised and lowered in unison. The block 257 is connected to the lower portion of the table 90 by means of another link 260, so that both the upper and lower ends of the table are reciprocated in unison.

The cams 250 and 251 previously referred to serve to raise and lower a block 261 by the medium of rollers 262 and 263. This block 261 is in turn connected to a toggle block 264 by means of a link 265, and the toggle block 264 is connected to the table 108 which carries the cutters already referred to by means of a link 266. Another toggle block 267 is pivoted to the lower portion of the machine and is connected to the toggle block 264 by a link 268. The toggle block 267 is in turn connected to the lower portion of the table 108 by means of a link 269, so that both the upper and lower ends of this table are moved in unison.

As a matter of convenience in construction, the various cutting bars 109 are mounted in blocks 270 of the table 108, and their positions can be adjusted by means of the set screws 271.

The main shaft 154 carries a crank pin 272 which is connected by means of a link 273 with a pawl and ratchet device 274 on the shaft 275 of a change speed box, designated in its entirety by the numeral 276. This change speed box is provided with suitable gears, so that the gear ratio between the shaft 272 and another shaft 277 may be modified as desired. The shaft 277 in turn carries a bevel gear 278 which meshes with the bevel gear 162 on the upper end of the crimping drum shaft already referred to. The shaft 277 also drives a shaft 279 through the medium of a chain drive connection 280; and the shaft 279 carries a bevel pinion 281 which meshes with the bevel pinion 216 already referred to.

While I have herein shown and described only a single embodiment of the features of my present invention, still it will be understood that I do not limit myself to the same except as I may do so in the claims.

I claim:

1. In a wire fence machine for the manufacture of wire fencing having horizontal strand wires and vertical cross stay wires, the combination of means for supporting the horizontal strand wires in parallel position within a vertical plane, means for feeding a plurality of stay wires equal in number to the spaces between the strand wires and in a direction initially parallel to the strand wires, each stay with being initially located below the position of the strand wire space which it is to occupy, means for directing each stay wire as fed into a vertical position across the strand wire space which it is to occupy, said directing means including a slotted guideway having a side opening facing in the direction of fence delivery, whereby the stay wire sections are placed across the spaces between the strand wires and with the adjacent stay wires overlapping each other at the positions of the strand wires, a rotatable primary twister in line with each strand wire and having oppositely disposed teeth adapted to engage the stay wire ends, a stationary knife blade beneath each strand wire and adjacent to the feeding position of the corresponding stay wire, a movable cutting blade corresponding to each stationary blade, means for moving the movable blades towards the respective stationary blades and for simultaneously moving the primary twisters into firm engagement with the corresponding stay wire ends, a rotatable fixed coiler for each strand wire and provided with a central strand wire passage, and located at the receiving side of the machine, a rotatable movable coiler for each strand wire and having a longitudinally extending strand wire slot reaching more than half way through its diameter and located at the delivery side of the machine, each coiler being provided on its end face with a tooth adapted to engage the end of the stay wire, means for turning the primary twisters substantially one-fourth turn after they are in engagement with the stay wire sections to thereby overlap the adjacent stay wire ends, means for thereafter rotating the fixed and movable coilers to thereby coil the stay wire ends around the strand wires, means for thereafter shifting the movable coilers sidewise to remove them from the position of the strand and stay wires, and means for thereafter moving the completed fencing a distance equal to the spacing between consecutive stay wires substantially as described.

2. In a wire fence machine for the manufacture of wire fencing having horizontal strand wires and vertical cross stay wires, the combination of means for supporting the horizontal strand wires in parallel position within a plane, means for feeding a plurality of stay wires equal in number to the spaces between the strand wires and in a direction initially parallel to the strand wires, each stay wire being initially located adjacent to the position of the strand wire space which it is to occupy, means for directing each stay wire as fed into a position across the strand wire space which it is to occupy, said directing means including a slotted guideway having a side opening facing in the direction of fence delivery, whereby the stay wire sections are placed across the space between the strand wires and with the adjacent stay wires overlapping each other at the positions of the strand wires, a rotatable primary twister in line with each strand wire and having oppositely disposed teeth adapted to engage the stay wire ends, a stationary knife blade beneath each strand wire and adjacent to the feeding position of the corresponding stay wire, a movable cutting blade corresponding to each stationary blade, means for moving the movable blades towards the respective stationary blades and for simultaneously moving the primary twisters into firm engagement with the corresponding stay wire ends, a rotatable fixed coiler for each strand wire and provided with a central strand wire passage and located at the receiving side of the machine, a rotatable movable coiler for each strand wire and having a longitudinally extending strand wire slot reaching more than half way through its diameter and located at the delivery side of the machine, each coiler being provided on its end face with a tooth adapted to engage the end of the stay wire, means for turning the primary twisters after they are in engagement with the stay wire sections to thereby overlap the adjacent stay wire ends, means for thereafter rotating the fixed and movable coilers to thereby coil the stay wire ends around the strand wires, means for thereafter shifting the movable coilers sidewise to remove them from the position of the strand and stay wires, and means for thereafter moving the completed fencing a distance equal to the spacing between consecutive stay wires, substantially as described.

3. In a wire fence machine for the manufacture of wire fencing having horizontal strand wires and cross stay wires, the combination of means for supporting the strand wires in parallel position within a plane, means for feeding a plurality of stay wires equal in number to the spaces between the strand wires and across the strand wire spaces, whereby the stay wire sections are placed across the spaces between the strand wires and with the adjacent stay wires overlapping each other at the positions of the strand wires, a rotatable primary twister in line with each strand wire and having oppositely disposed teeth adapted to engage the stay wire ends, a stationary knife blade beneath each strand wire and adjacent to the feeding position of the corresponding stay wire, a movable cutting blade corresponding to each stationary blade, means for moving the movable blades towards the respective stationary blades and for simultaneously moving the primary twisters into firm engagement with the corresponding stay wire ends, a rotatable fixed coiler for each strand wire and provided with a central strand wire passage and located at the receiving side of the machine, a rotatable movable coiler for each strand wire and having a longitudinally extending strand wire slot reaching more than half way through its diameter and located at the delivery side of the machine, each coiler being provided on its end face with a tooth adapted to engage the end of the stay wire, means for turning the primary twisters after they are in engagement with the stay wire sections to thereby overlap the adjacent stay wire ends, means for thereafter rotating the fixed and movable coilers to thereby coil the stay wire ends around the strand wires, means for thereafter shifting the movable coilers sidewise to remove them from the position of the strand and stay wires, and means for thereafter moving the completed fencing a distance equal to the spacing between consecutive stay wires, substantially as described.

4. In a wire fence machine for the manufacture of wire fencing having horizontal strand wires and cross stay wires, the combination of means for supporting the horizontal strand wires in parallel positions within a plane, means for feeding a plurality of stay wires equal in number to the spaces between the strand wires across the spaces between the strand wires and with the adjacent stay wires overlapping each other at the positions of the strand wires, a rotatable primary twister in line with each strand wire and having means adapted to engage the stay wire ends, co-operating knife blades adjacent to the strand wires in position to operate upon the corresponding stay wires, means for moving the cutting blades for the cutting operation and for simultaneously moving the primary twisters into firm engagement with the stay wire ends, a rotatable fixed coiler for each strand wire and provided with a central strand wire passage, and located at the receiving side of the machine, a rotatable removable coiler for each strand wire and having a longitudinally extending strand wire slot reaching more than half way through its diameter and located at the delivery side of the machine, each coiler being provided with means adapted to engage one of the stay wire ends, means for turning the primary twisters after they are in engagement with the stay wire sections to thereby overlap the adjacent stay wire ends, means for thereafter rotating the fixed and movable coilers to thereby coil the stay wire ends around the strand wires, means for thereafter shifting the movable coilers sidewise to remove them from the position of the strand and stay wires, and means for thereafter moving the completed fencing a distance equal to the spacing between consecutive stay wires, substantially as described.

5. In a wire fence machine for the manufacture of wire fencing having horizontal strand wires and cross stay wires, the combination of means for supporting the strand wires in parallel position within a plane, means for feeding a plurality of stay wires equal in number to the spaces between the strand wires and across the spaces between the strand wires and with the adjacent stay wires overlapping each other at the positions of the strand wires, a rotatable primary twister in line with each strand wire and having means adapted to engage the stay wires, co-operating knife blades adjacent to each strand wire adapted to operate upon a stay wire, means for moving the knife blades to sever the stay wires and for simultaneously moving the primary twisters into firm engagement with the corresponding stay wire ends, a rotatable fixed coiler for each strand wire and provided with a central strand wire passage and located at the receiving side of the machine, a rotatable movable coiler for each strand wire and having a longitudinally extending strand wire slot reaching more than half way through its diameter and located at the delivery side of the machine, the coilers being provided with means to engage the stay wire ends, means for turning the primary twisters after they are in engagement with the stay wire sections to thereby overlap the adjacent stay wire ends, means for thereafter rotating the fixed and movable coilers to thereby coil the stay wire ends around the strand wires, and means for thereafter shifting the movable coilers sidewise to remove them from the position of the strand and stay wires, substantially as described.

6. In a wire fence machine for the manufacture of wire fencing having horizontal strand wires and cross stay wires, the combination of means for supporting the strand wires in parallel position within a plane, means for feeding a plurality of stay wires equal in number to the spaces between the strand wires, across the strand wire spaces, and with the adjacent stay wires overlapping each other at the positions of the strand wires, a rotatable primary twister in line with each strand wire and having means adapted to engage the stay wire ends, means for severing the stay wires adjacent to the strand wires, means for simultaneously moving the primary twisters into firm engagement with the stay wire ends, a rotatable fixed coiler for each strand wire at the receiving side of the machine, a rotatable movable coiler for each strand wire at the delivery side of the machine, means on said coilers adapted to engage the stay wire ends, means for turning the primary twisters after they are in engagement with the stay wire sections to thereby overlap the adjacent stay wire ends, means for thereafter rotating the fixed and movable coilers to thereby coil the stay wire ends around the strand wires, and means for thereafter moving the completed fencing a distance equal to the spacing between consecutive stay wires, substantially as described.

7. In a wire fence machine for the manufacture of wire fencing having horizontal strand wires and cross stay wires, the combination of means for supporting the strand wires in parallel position within a plane, means for feeding a plurality of stay wires equal in number to the spaces between the strand wires, across the spaces between the strand wires and with the adjacent stay wires overlapping each other at the positions of the strand wires, a rotatable primary twister in line with each strand wire and having means adapted to engage the stay wire ends, suitable cutting means adjacent to each strand wire, means for operating the cutting means and for simultaneously moving the primary twisters into firm engagement with the stay wire ends, and suitable coilers at the receiving and delivery sides of the stay wire sections for coiling the ends thereof around the strand wires, substantially as described.

8. In a wire fence machine for the manufacture of wire fencing having horizontal strand wires and cross stay wires, the combination of means for supporting the horizontal strand wires in parallel position within a plane, means for feeding a plurality of stay wires equal in number to the spaces between the strand wires and across the strand wire spaces and with the adjacent stay wires overlapping each other at the positions of the strand wires, means for bending the overlapped portions of the stay wires towards the strand wires before severing the stay wires, means for severing the stay wires adjacent to the positions of the strand wires, rotary means operating on axes at right angles to the strand wires for twisting the overlapped and bent end portions of the stay wires at the positions of the strand wires, and suitable coilers at the receiving and delivery sides of the stay wire sections for coiling the end portions of the stay wires around the strand wires, substantially as described.

9. In a wire fence machine for the manufacture of wire fencing having horizontal strand wires and cross stay wires, the combination of means for supporting the strand wires in parallel position within a plane, means for feeding a plurality of stay wires equal in number to the spaces between the strand wires and across the spaces between the strand wires and with the adjacent stay wires overlapping each other at the positions of the strand wires, means for bending the overlapped portions of the stay wires towards the strand wires before severing the stay wires, means for severing the stay wires adjacent to the strand wires, rotary means operating on axes at right angles to the strand wires for twisting the overlapped stay wire end portions, and means for thereafter coiling the ends of the stay wires around the strand wires, substantially as described.

10. In a wire fence machine for the manufacture of wire fencing having horizontal strand wires and cross stay wires, the combination of means for supporting the strand wires in parallel position within a plane, means for feeding a plurality of stay wires equal in number to the spaces between the strand wires, across the spaces between the strand wires and with the adjacent stay wires overlapping each other at the positions of the strand wires, means for bending the overlapped portions of the stay wires towards the strand wires, means in alignment with and at right angles to each strand wire for twisting together the overlapped end portions of the stay wires, a rotatable fixed coiler for each strand wire and provided with a central strand wire passage and located at the receiving side of the machine, a rotatable movable coiler for each strand wire and having a longitudinally extending strand wire slot reaching more than half way through its diameter and located at the delivery side of the machine, means on said coilers for engaging the stay wire ends, and means for rotating the coilers to coil the stay wire ends around the strand wires, substantially as described.

11. In a wire fence machine for the manufacture of wire fencing having horizontal strand wires and cross stay wires, the combination of means for supporting the strand wires in parallel position within a plane, means for feeding a plurality of stay wires equal in number to the spaces between the strand wires, across the spaces between the strand wires and with the adjacent stay wires overlapping each other at the positions of the strand wires, means for bending the overlapped portions of the stay wires towards the strand wires, means in alignment with and at right angles to each strand wire for twisting together the overlapped end portions of the stay wires, and means for coiling the end portions of the stay wires around the strand wires, substantially as described.

12. In a wire fence machine for the manufacture of wire fencing having horizontal strand wires and cross stay wires, the combination of means for supporting the strand wires in parallel position within a plane, means for feeding a plurality of stay wires equal in number to the spaces between the strand wires, across the spaces between the strand wires and with their adjacent ends overlapping each other at the positions of the strand wires, means for bending the overlapped portions of the stay wires towards the strand wires before severing the stay wires, means for severing the stay wires adjacent to the strand wires, rotary means operating on axes at right angles to the strand wires for twisting together the overlapped end portions of the stay wires in alignment with the strand wires, means for coiling the ends of the stay wires around the strand wires after they are twisted together, means for moving said coiling means from the strand wires at the delivery side of the machine, and means for thereafter moving the completed fencing a distance equal to the spacing between consecutive stay wires, substantially as described.

13. In a wire fence machine for the manufacture of wire fencing having horizontal strand wires and cross stay wires, the combination of means for supporting the strand wires in parallel position within a plane, means for feeding a plurality of stay wires equal in number to the spaces between the strand wires, across the spaces between the strand wires and with their adjacent ends overlapped at the positions of the strand wires, means for bending the overlapped portions of the stay wires towards the strand wires before severing the stay wires, means for severing the stay wires adjacent to the strand wires, rotary means operating on axes at right angles to the strand wires for twisting the overlapped portions of the stay wires together in alignment with the strand wires, means for coiling the stay wire ends around the strand wires, means for moving said coiling means from the path of the fencing, and means for thereafter moving the completed fencing a distance equal to the spacing between consecutive stay wires, substantially as described.

14. In a wire fence machine for the manufacture of wire fencing having horizontal strand wires and cross stay wires, the combination of means for supporting the strand wires within a plane, means for feeding a plurality of stay wires equal in number to the spaces between the strand wires, across the spaces between the strand wires and with their end portions overlapped adjacent to the strand wires, means for bending the overlapped portions of the stay wires towards the strand wires, rotary means operating on axes at right angles to the strand wires for twisting together the overlapped end portions of the stay wires, means for coiling the end portions of the stay wires around the strand wires, means for removing the coilers from the path of travel of the strand wires, and means for normally shifting the completed fencing a given distance between stay wire operations, substantially as described.

15. In a wire fence machine for the manufacture of wire fencing having horizontal strand wires and cross stay wires, the combination of means for supporting the strand wires in parallel position within a plane, means for periodically feeding said strand wires longitudinally, means for feeding stay wire sections across the spaces between strand wires, means for coiling the stay wire ends around the strand wires, during intervals between the strand wire feeds, and means for periodically preventing feed of the stay wires to thereby regulate the distance between the consecutive stay wire positions, substantially as described.

16. In a wire fence machine for the manufacture of wire fencing having horizontal strand wires and cross stay wires, the combination of means for supporting the strand wires in parallel position within a plane, means for feeding stay wire sections into position across the spaces between the strand wires, means for coiling the end portions of the stay wires around the strand wires, means for regularly shifting the fencing a given distance between stay wire operations, and means for increasing the distance of such shift after a predetermined amount of fence is produced, substantially as described.

17. In a machine for the manufacture of wire fencing having horizontal strand wires and cross stay wires, the combination of means for supporting the horizontal strand wires in parallel position within a plane, means for feeding stay wire sections into place across the spaces between the strand wires and for attaching the stay wire sections to the strand wires, means for periodically shifting the strand wires endwise to regularly space the stay wires, and means for increasing the distance of shift each time a predetermined amount of fencing is produced, substantially as described.

18. In a machine for the manufacture of wire fencing having horizontal strand wires and cross stay wires, the combination of means for supporting the horizontal strand wires in parallel position within a plane, means for periodically feeding stay wire sections into place across the spaces between the strand wires and for coiling the ends of the stay wire sections around the strand wires, means for normally shifting the strand wires a given distance between the stay wire operations, and means for increasing such distance each time a predetermined amount of fencing is produced, substantially as described.

19. In a wire fence machine for the manufacture of wire fencing having horizontal strand wires and cross stay wires, the combination of means for supporting the strand wires in parallel position within a plane, means for periodically shifting the strand wires lengthwise a given distance according to the normal spacing between the stay wires, means for normally feeding stay wire sections into place across the strand wire spaces and for coiling the ends of the stay wires so fed around the strand wires, means for periodically interrupting the stay wire feeds and for thereafter recommencing the stay wire feeds, and means for regulating the amount of strand wire feed between such interruptions, substantially as described.

20. In a wire fence machine for the manufacture of wire fencing having horizontal strand wires and cross stay wires, the combination of means for supporting the horizontal strand wires in position within a plane, means for feeding stay wire sections across the spaces between the strand wires at a regular and normal spacing and for coiling the ends of the stay wire sections around the strand wires, means for periodically enlarging the distance between stay wire positions and for thereafter restoring the distance between stay wire feeds to its normal spacing aforesaid, and means for regulating the amount of fence feed between such periodical enlargements, substantially as described.

21. In a wire fence machine for the manufacture of wire fencing having horizontal strand wires and cross stay wires, the combination of means for supporting the horizontal strand wires in parallel position within a plane, means for feeding stay wire sections across the spaces between the strand wires, means for normally moving the strand wires a given distance between stay wire operations, and means for periodically enlarging said distance and for thereafter continuing the operations with such distance restored to its previous and normal amount, substantially as described.

22. In a wire fence machine for the manufacture of wire fencing having horizontal strand wires and cross stay wires, the combination of means for supporting the strand wires within a plane, means for feeding stay wire sections across the spaces between the strand wires, means for normally feeding the strand wires a given distance between stay wire operations, means for periodically enlarging said distance and for thereafter continuing the operations with such distance restored to its previous normal amount, and means for regulating the number of stay wire feeds between such enlargements, substantially as described.

23. In a wire fence machine for the manufacture of wire fencing having horizontal strand wires and cross stay wires, the combination of means for supporting the strand wires within a plane, means for periodically advancing the strand wires a given distance, stay wire feeding mechanism adjacent to the strand wires and adapted when operated to feed stay wire sections into position across the spaces between the strand wires, means for normally operating said stay wire feeding mechanism once for each advancement of the strand wires, means for interrupting said normal feed of stay wire sections and for again thereafter restoring said normal feed of stay wire sections, and means for regulating the number of strand wire feeds between two consecutive interruptions, substantially as described.

24. In a wire fence machine for the manufacture of wire fencing having horizontal strand wires and cross stay wires, the combination of means for supporting the strand wires within a plane, means for periodically advancing the strand wires a given distance, stay wire feeding mechanism adjacent to the strand wires and adapted when operated to feed stay wire sections into position across the spaces between the strand wires, means for normally operating said stay wire feeding mechanism once for each advancement of the strand wires, and means for interrupting said normal feed of stay wire sections and for again thereafter restoring said normal feed of stay wire sections, substantially as described.

25. In a wire fence machine for the manufacture of wire fencing having horizontal strand wires and cross stay wires, the combination of means for supporting the strand wires within a plane, means for intermittently feeding the strand wires lengthwise, means for feeding cross stay wires into position across the spaces between the strand wires, means for normally operating said stay wire feeding mechanism synchronously with respect to the strand wire feeds, means for interrupting the functioning of the stay wire feeding mechanism and for again thereafter restoring said normal stay wire feeding operations, and means for regulating the total amount of strand wire movement between two such interruptions, substantially as described.

26. In a wire fence machine for the manufacture of wire fencing having horizontal strand wires and cross stay wires, the combination of means for supporting the strand wires within a plane, means for intermittently feeding the strand wires lengthwise, means for feeding cross stay wires into position across the spaces between the strand wires, means for normally operating said stay wire feeding mechanism synchronously with respect to the strand wire feeds, and means for interrupting the functioning of the stay wire feeding mechanism and for again thereafter restoring said normal stay wire feeding operations, substantially as described.

CARL A. PORATH.